(12) United States Patent
Yamamoto et al.

(10) Patent No.: US 11,824,284 B2
(45) Date of Patent: Nov. 21, 2023

(54) STRUCTURE FOR CONNECTING FLEXIBLE FLAT CABLES

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Hiroki Hirai, Mie (JP); Makoto Higashikozono, Mie (JP); Kazuyoshi Ohara, Mie (JP); Hisashi Sawada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 688 days.

(21) Appl. No.: 16/980,281

(22) PCT Filed: Aug. 30, 2018

(86) PCT No.: PCT/JP2018/032065
§ 371 (c)(1),
(2) Date: Sep. 11, 2020

(87) PCT Pub. No.: WO2019/180996
PCT Pub. Date: Sep. 26, 2019

(65) Prior Publication Data
US 2021/0249802 A1 Aug. 12, 2021

(30) Foreign Application Priority Data
Mar. 22, 2018 (JP) .................. 2018-054518

(51) Int. Cl.
*H01R 12/59* (2011.01)
*H01R 12/61* (2011.01)
(Continued)

(52) U.S. Cl.
CPC ......... *H01R 12/613* (2013.01); *B60R 16/023* (2013.01); *H01B 7/08* (2013.01); *H01R 13/688* (2013.01); *H02G 15/08* (2013.01)

(58) Field of Classification Search
CPC ...... H01R 12/613; H01R 12/61; H01R 12/59; H01R 13/688; H01R 13/684; H02G 15/08; H01B 7/08
(Continued)

(56) References Cited

U.S. PATENT DOCUMENTS 3,671,918 A * 6/1972 Mitchell ................ H01R 31/00
439/651
4,521,969 A * 6/1985 Greenwood ........... H05K 3/365
33/645
(Continued)

FOREIGN PATENT DOCUMENTS

JP S63-205072 A 8/1988
JP 2003-168508 A 6/2003
(Continued)

*Primary Examiner* — Harshad C Patel
(74) *Attorney, Agent, or Firm* — Venjuris, P.C.

(57) ABSTRACT

A trunk cable 12 includes a signal trunk conductor 31 that is electromagnetically shielded by a shield layer 35. A branch cable 13 includes a signal branch conductor 38 that is electromagnetically shielded by a shield layer 42. The signal trunk conductor 31 and the signal branch conductor 38 are electrically connected to each other by a relay bus bar 64 that is electromagnetically shielded by a base shielding member 65 and a cover shielding member 27.

2 Claims, 31 Drawing Sheets

(51) Int. Cl.
*B60R 16/023* (2006.01)
*H01B 7/08* (2006.01)
*H01R 13/688* (2011.01)
*H02G 15/08* (2006.01)

(58) Field of Classification Search
USPC .......................................................... 439/67
See application file for complete search history.

(56) References Cited

U.S. PATENT DOCUMENTS

| | | | | |
|---|---|---|---|---|
| 5,093,985 | A * | 3/1992 | Houldsworth | H05K 1/148 |
| | | | | 29/830 |
| 5,522,727 | A * | 6/1996 | Saito | H01R 13/658 |
| | | | | 439/79 |
| 5,844,783 | A * | 12/1998 | Kojima | H05K 1/0219 |
| | | | | 361/826 |
| 5,964,620 | A * | 10/1999 | Takahashi | H01R 13/6589 |
| | | | | 439/579 |
| 7,304,373 | B2 * | 12/2007 | Taggart | H01L 23/50 |
| | | | | 257/E23.079 |
| 7,387,537 | B1 * | 6/2008 | Daily | H01R 13/6272 |
| | | | | 439/282 |
| 8,118,611 | B2 * | 2/2012 | Jeon | H01R 31/08 |
| | | | | 439/511 |
| 9,306,313 | B2 * | 4/2016 | Heggemann | H01R 13/40 |
| 9,478,885 | B2 * | 10/2016 | MacDougall | H01R 12/73 |
| 9,525,233 | B2 * | 12/2016 | Staeber | H01R 13/46 |
| 9,806,445 | B2 * | 10/2017 | Fornage | H01R 12/592 |
| 2005/0057320 | A1 * | 3/2005 | Brandt | H02J 13/00007 |
| | | | | 333/24 R |
| 2007/0049107 | A1 * | 3/2007 | Su | H01R 31/02 |
| | | | | 439/502 |
| 2011/0168228 | A1 * | 7/2011 | McGreevy | H02S 40/34 |
| | | | | 136/244 |
| 2013/0323955 | A1 * | 12/2013 | Nishio | H01R 12/732 |
| | | | | 439/325 |

FOREIGN PATENT DOCUMENTS

| | | |
|---|---|---|
| JP | 2004-311133 A | 11/2004 |
| JP | 2009-212018 A | 9/2009 |

* cited by examiner

FIG. 5
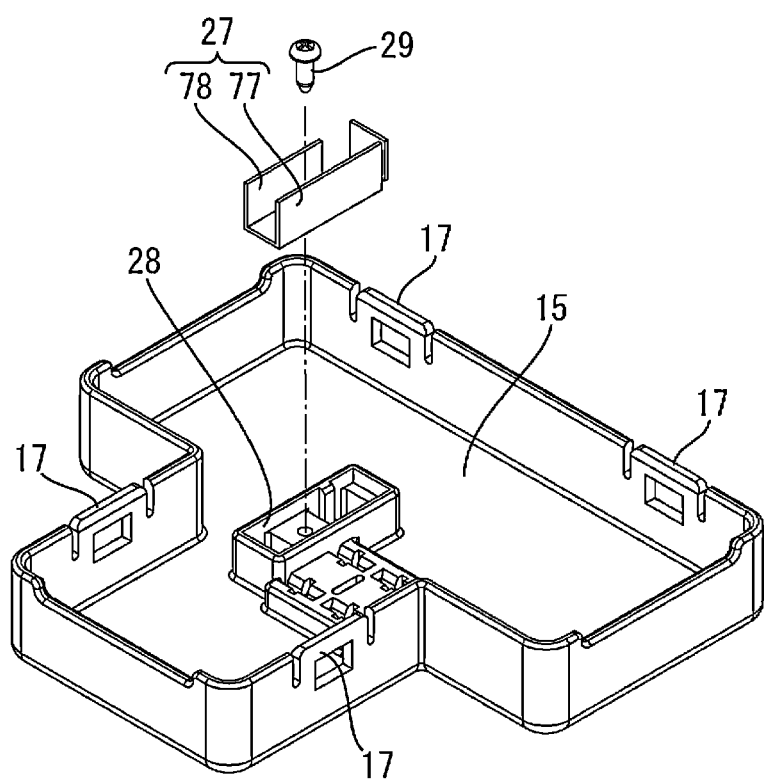
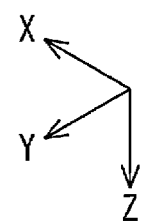

FIG. 6
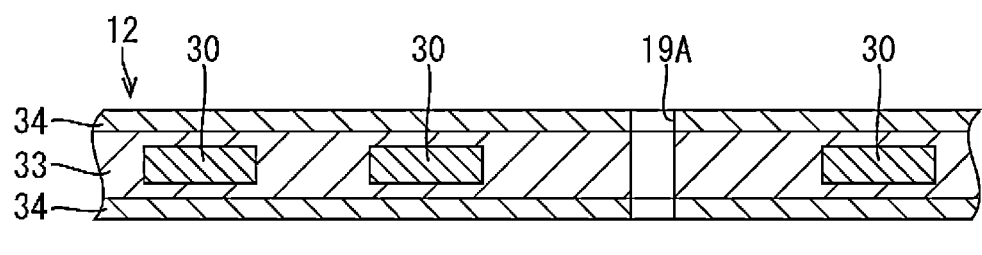
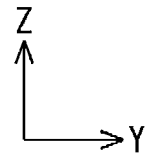
FIG. 7
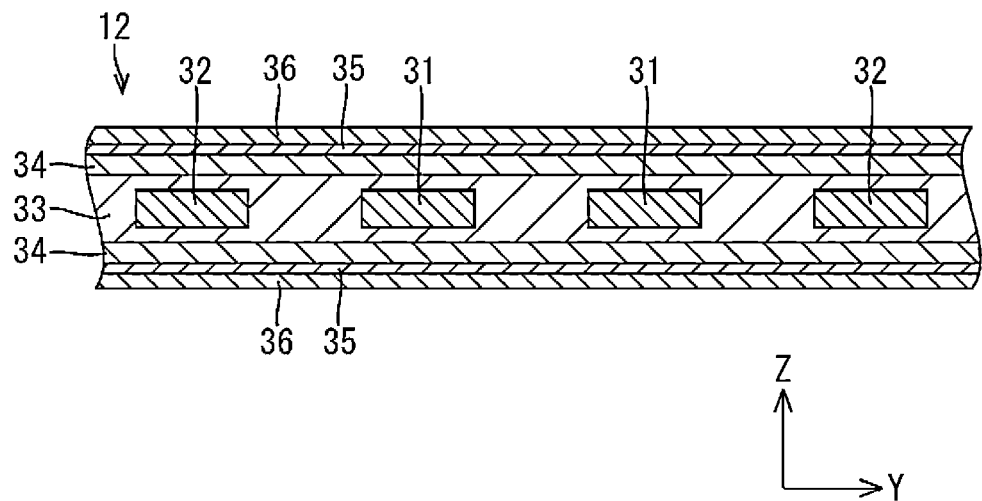
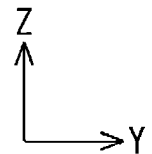

FIG. 32
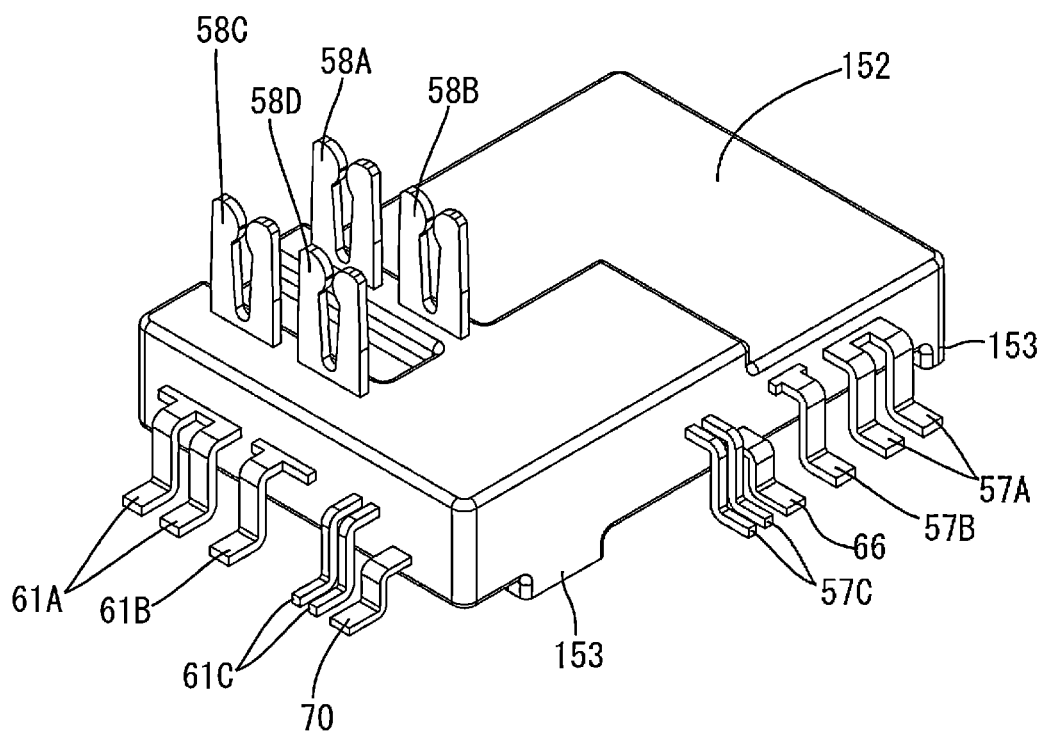
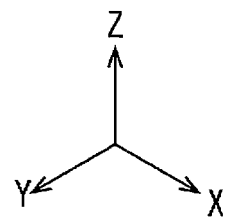

STRUCTURE FOR CONNECTING FLEXIBLE FLAT CABLES

CROSS REFERENCE TO RELATED APPLICATIONS

This application is a national phase of PCT application No. PCT/JP2018/032065, filed on 30 Aug. 2018, which claims priority from Japanese patent application No. 2018-054518, filed on 22 Mar. 2018, all of which are incorporated herein by reference.

TECHNICAL FIELD

Technology disclosed in this specification relates to a structure for connecting a plurality of flexible flat cables.

BACKGROUND

Conventionally known is a flexible flat cable that has a conductive path and a flexible insulating layer enclosing the conductive path. Because this flexible flat cable has flexibility, it is possible to suitably use the flexible flat cable if wiring is required in a limited space such as in a vehicle, for example.

The technology disclosed in Japanese Patent Laid-Open Publication No. 2003-168508 is known as technology for connecting a plurality of flexible flat cables. According to this technology, a conductive path of a lower flexible flat cable and a conductive path of an upper flexible flat cable are electrically connected to each other by a connection member by inserting the connection member in a state in which a plurality of flexible flat cables to be connected to each other are vertically placed on each other.

PRIOR ART DOCUMENT

Patent Document

Patent Document 1: JP 2003-168508A

SUMMARY OF THE INVENTION

Problems to be Solved

If a conductive path of a flexible flat cable needs to be electromagnetically shielded, it is conceivable to provide a conductive shield layer for further enclosing an insulating layer enclosing the conductive path. When flexible flat cables that have such a shielding structure are to be connected to each other, if a method is adopted in which a connection member is inserted in a state in which a plurality of flexible flat cables are vertically placed on each other as in conventional technology, an issue arises that the connection member cannot be electromagnetically shielded because the connection member is not enclosed by the shield layer.

Technology disclosed in this specification has been made based on the above-described circumstances, and aims to provide a structure for connecting a plurality of flexible flat cables that include electromagnetically shielded conductive paths.

Means to Solve the Problem

A structure for connecting flexible flat cables according to technology disclosed in this specification includes a flexible flat trunk cable, which includes a signal trunk conductor; a ground trunk conductor; a trunk shield that is electrically connected to the ground trunk conductor and encloses the signal trunk conductor to magnetically shield the signal trunk conductor; and an insulating trunk coating for covering the signal trunk conductor, the ground trunk conductor, and the trunk shield, and a flexible flat branch cable, which includes a signal branch conductor; a ground branch conductor; a branch shield that is electrically connected to the ground branch conductor and encloses the signal branch conductor to electromagnetically shield the signal branch conductor; and an insulating branch coating for covering the signal branch conductor, the ground branch conductor, and the branch shield, a relay bus bar that includes a trunk-side terminal portion connected to the signal trunk conductor, and a branch-side terminal portion connected to the signal branch conductor; and a shielding member for enclosing the relay bus bar to electromagnetically shield the relay bus bar.

According to the above-described configuration, it is possible to electromagnetically shield the relay bus bar by the shielding member. Accordingly, it is possible to connect the signal trunk conductor of the flexible flat trunk cable and the signal branch conductor of the flexible flat branch cable in a state in which the relay bus bar is electromagnetically shielded.

Embodiments of the technology disclosed in this specification preferably have the following features.

It is preferable that the shielding member includes a trunk-side ground terminal portion connected to the ground trunk conductor, and a branch-side ground terminal portion connected to the ground branch conductor.

According to the above-described configuration, it is possible to improve shield performance of the relay bus bar because the shielding member is connected to the ground trunk conductor and the ground branch conductor.

It is preferable that the shielding member includes a base shielding member that includes the trunk-side ground terminal portion and the branch-side ground terminal portion, and a cover shielding member for enclosing the relay bus bar between the base shielding member and the cover shielding member.

According to the above-described configuration, it is possible to easily shield the relay bus bar by connecting the base shielding member to the ground trunk conductor and the ground branch conductor, and to arranging the relay bus bar between the base shielding member and the cover shielding member.

According to this embodiment, it is preferable that the base shielding member and the cover shielding member are electrically connected to each other.

According to the above-described configuration, it is possible to electrically connect the ground trunk conductor, the ground branch conductor, the base shielding member, and the cover shielding member, and thus to reliably shield the relay bus bar.

It is preferable that an insulating cover made of an insulating synthetic resin is interposed between the relay bus bar and the cover shielding member.

According to the above-described configuration, it is possible to inhibit short circuits between the relay bus bar and the cover shielding member.

Effect of the Invention

According to the technology disclosed in this specification, it is possible to connect a plurality of flexible flat cables having electromagnetically shielded conductive paths.

BRIEF DESCRIPTION OF THE DRAWING

FIG. 4 is a cross-sectional view of the branch box taken along line IV-IV in

FIG. 3.

FIG. 5 is a perspective view showing a process for attaching a cover shielding member to the cover.

FIG. 6 is a schematic cross-sectional view showing a structure of a region of a trunk cable in which power trunk conductors are arranged.

FIG. 7 is a schematic cross-sectional view showing a structure of a region of the trunk cable in which signal trunk conductors and ground trunk conductors are arranged.

FIG. 13 is a perspective view showing a state in which the trunk cable and the branch cable are arranged and positioned in the case and.

FIG. 32 is a perspective view showing a state in which a conductive relay path, a cover shielding member, an insulating cover, and a base shielding member according to Embodiment 6 are formed through insert molding.

DETAILED DESCRIPTION TO EXECUTE THE INVENTION

Embodiment 1

Figure 1:
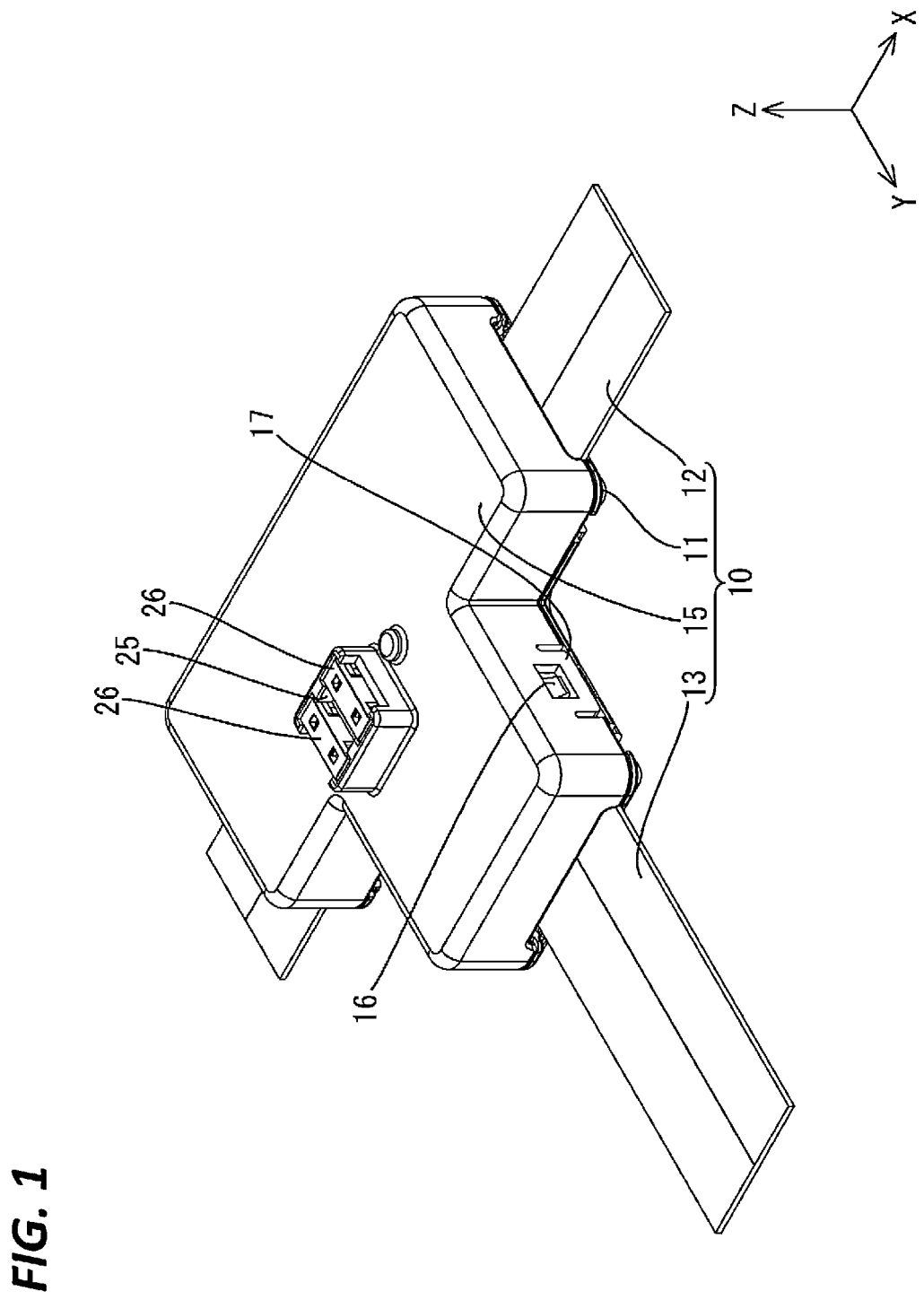
FIG. 1 is a perspective view showing a branch box according to Embodiment 1.
Figure 2:
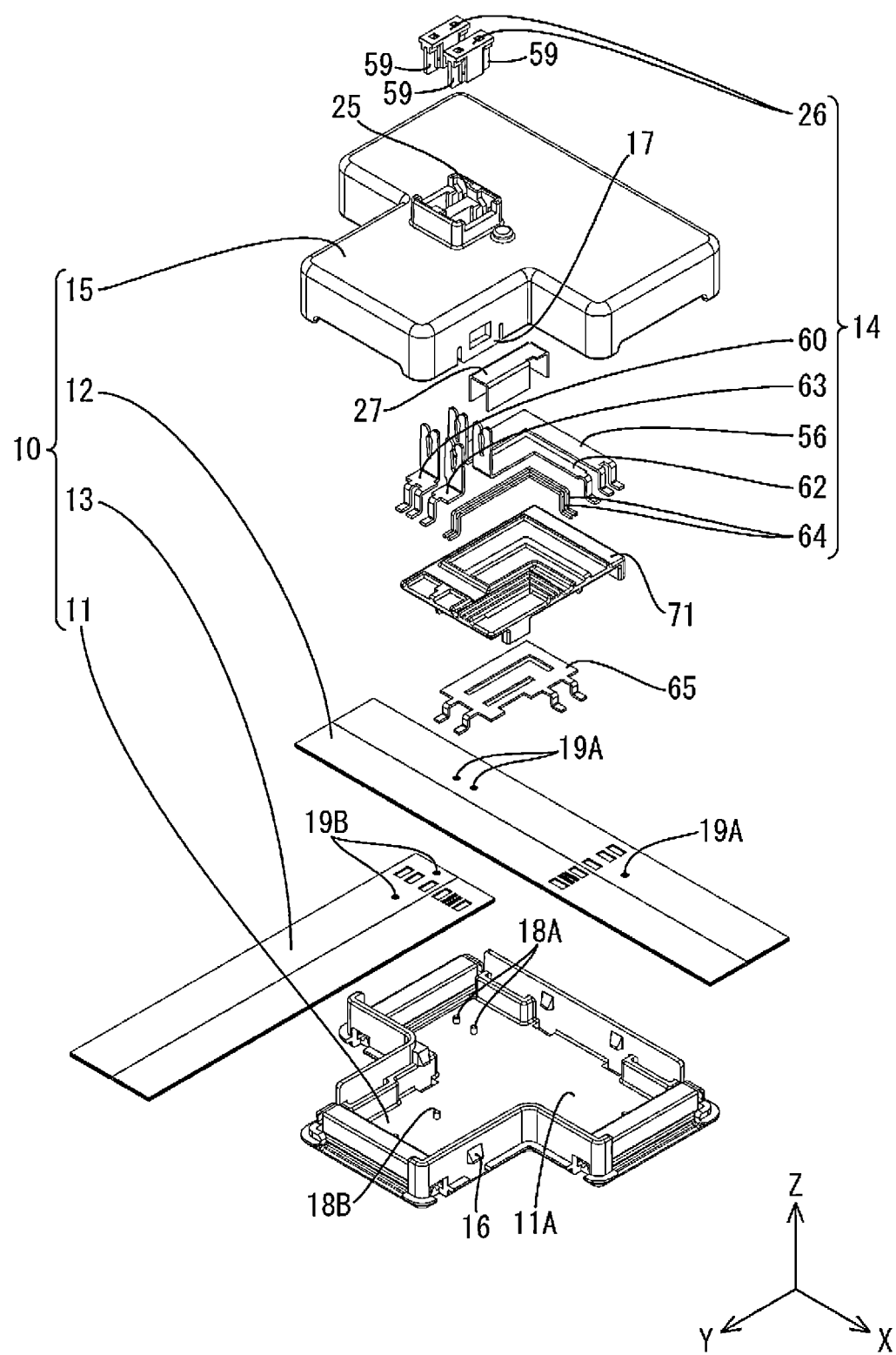
FIG. 2 is an exploded perspective view showing the branch box.

Embodiment 1 of technology disclosed in this specification will be described with reference to FIGS. 1 to 17. A branch box 10 according to this embodiment includes a case 11, a trunk cable 12 (an example of a flexible flat trunk cable) fixed to the case 11, a branch cable 13 (an example of a flexible flat branch cable) fixed to the case 11, a conductive relay path 14 for electrically connecting the trunk cable 12 and the branch cable 13, and a cover 15 mounted on the case 11. The branch box 10 is installed in a vehicle (not shown) such as an electric car or a hybrid automobile, for example, and branches a power circuit and a signal circuit. In the following description, "upper" refers to the Z-direction, "front" refers to the Y-direction, and "left" refers to the X-direction. Note that, with regard to a plurality of the same members, only some of the same members may be given reference numerals, and the other members may not be given reference numerals.

Branch Box 10

As shown in FIG. 1, the branch box 10 is substantially T-shaped overall, when viewed from above. A rear portion of the branch box 10 has a rectangular shape that is elongated in the right-left direction, when viewed from above. A front portion of the branch box 10 extends forward from the vicinity of the center, with respect to the right-left direction, of the rear portion of the branch box 10, and has a rectangular shape, when viewed from above. A trunk cable 12 is led out to the left and to the right from a left end portion and a right end portion of the branch box 10. The branch cable 13 is led out forward from a front end portion of the branch box 10.

The branch box 10 has a case 11 that is open upward, and a cover 15 mounted on the case 11 from above. The cover 15 is slightly larger than the outer shape of the case 11. The case 11 has a bottom wall 11A and side walls that extend upward from side edges of the bottom wall 11A. The cover 15 has an upper wall and side walls that extend downward from side edges of the upper wall. The case 11 and the cover 15 are assembled into a single body through elastic engagement between locking portions 16 protruding from outer surfaces of the side walls of the case 11 and locking reception portions 17 provided on the side walls of the cover 15.

Case 11

Figure 3:
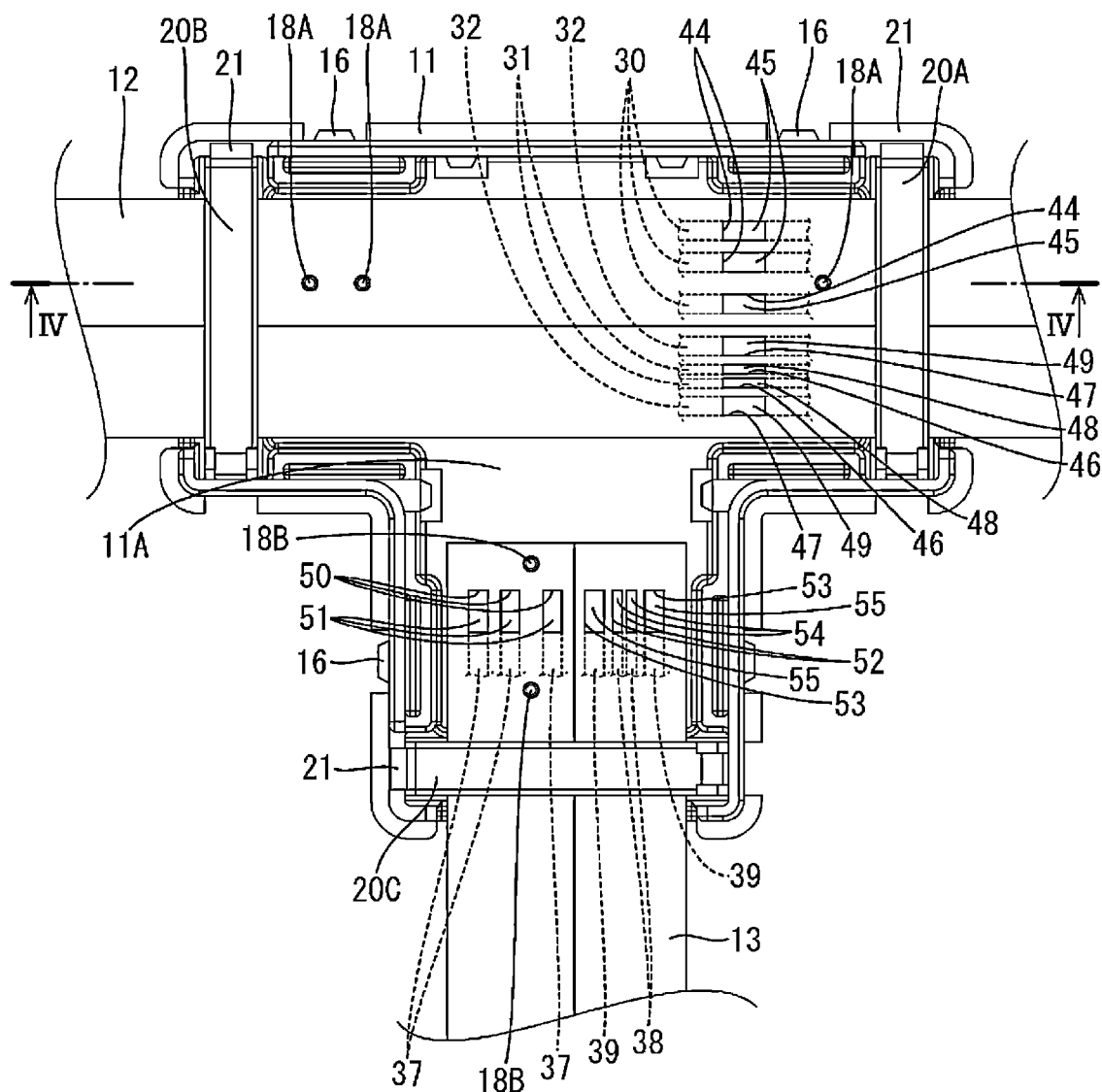
FIG. 3 is a plan view showing the branch box from which a cover is detached.
Figure 4:
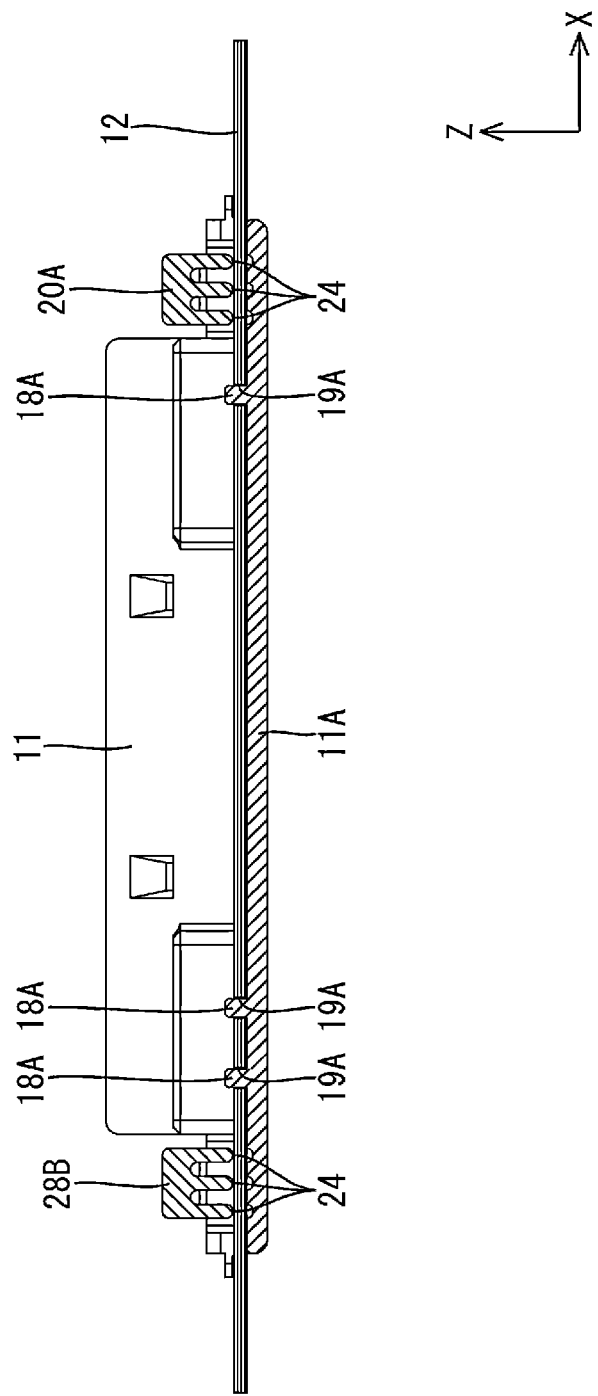

As shown in FIG. 3, on the bottom wall 11A of the case 11, two positioning pins 18A are arranged side-by-side and are spaced apart from each other in the right-left direction at positions closer to the right end portion and protrude upward from the bottom wall 11A, and one positioning pin 18A protrudes upward at a position closer to its left end portion. When these positioning pins 18A are inserted into the positioning holes 19A passing through the trunk cable 12, the trunk cable 12 is positioned relative to the case 11. The positioning holes 19A formed in the trunk cable 12 are formed at positions of the trunk cable 12 that are different from the positions of power trunk conductors 30, signal trunk conductors 31, and ground trunk conductors 32, which will be described later.

Also, on the bottom wall 11A of the case 11, two positioning pins 18B are arranged side-by-side and are spaced apart from each other in the front-rear direction at positions closer to its front end portion, and protrude upward. When these positioning pins 18B are inserted into positioning holes 19B passing through the branch cable 13, the branch cable 13 is positioned relative to the case 11. The positioning holes 19B formed in the branch cable 13 are formed at positions of the branch cable 13 that are different from the positions of power branch conductors 37, and signal branch conductors 38, and ground branch conductors 39, which will be described later.

The left end portion of the case 11 is not provided with a side wall, and is open to the left. Also, the right end portion of the case 11 is not provided with a side wall, and is open to the right. Accordingly, the trunk cable 12 is led out to the left and to the right from the case 11.

The left end portion of the case 11 is provided with a left holding portion 20A (an example of a holding portion) for holding the trunk cable 12 between the left holding portion 20A and the bottom wall 11A, the left holding portion 20A and the case 11 being formed as a single body via a hinge 21. A locking claw 22 is formed at a leading end of the left holding portion 20A. When the locking claw 22 is locked to a locked portion 23 provided on a side of the case 11 located opposite to the hinge 21, the trunk cable 12 is held between the bottom wall 11A and the left holding portion 20A. A plurality (three in this embodiment) of holding ribs 24 are formed on the side of the left holding portion 20A that faces the trunk cable 12 in a state in which the locking claw 22 and the locked portion 23 are locked to each other, the holding ribs 24 extending along the front-rear direction and being arranged side-by-side and being spaced apart from each other in the right-left direction. When the holding ribs 24 come into contact with the trunk cable 12 from above, the trunk cable 12 is reliably held between them.

The right end portion of the case 11 is provided with a right holding portion 20B (an example of a holding portion) for holding the trunk cable 12 between the right holding portion 20B and the bottom wall 11A, the right holding portion 20B and the case 11 being formed as a single body via a hinge 21. Because the constituent elements of the right holding portion 20B are the same as those of the left holding portion 20A, the same constituent elements are given the same reference numerals, and their redundant description is omitted.

The front end portion of the case 11 is provided with a branch holding portion 20C (an example of a holding portion) for holding the branch cable 13 between the branch holding portion 20C and the bottom wall 11A, the branch holding portion 20C and the case 11 being formed as a single body via a hinge 21. Because the constituent elements of the branch holding portion 20C are the same as those of the left holding portion 20A, the same constituent elements are given the same reference numerals, and their redundant description is omitted.

Cover 15

As shown in FIG. 1, the upper wall of the cover 15 is provided with a fuse mounting portion 25 that is open upward, at a position located in the vicinity of the center in the right-left direction and in the front-rear direction. A plurality (two in this embodiment) of fuses 26 are mounted on the fuse mounting portion 25 and are arranged side-by-side in the right-left direction.

A lower end portion of the side wall located at the left end portion of the cover 15 is recessed slightly upward. Similarly, a lower end portion of the side wall located at the right end portion of the cover 15 is recessed slightly upward. Accordingly, a gap into which the trunk cable 12 can be inserted is formed between the lower end portions and the bottom wall 11A of the case 11.

Also, the lower end portion of the side wall located at the front end portion of the cover 15 is recessed slightly upward. Accordingly, a gap into which the branch cable 13 can be inserted is formed between this lower end portion and the bottom wall 11A of the case 11.

As shown in FIG. 5, a shielding member mounting portion 28 on which a cover shielding member 27 (an example of a shielding member), which will be described later, is mounted protrudes downward from the lower side of the upper wall of the cover 15. The shielding member mounting portion 28 is provided with a closed-end hole passing through its upper wall. When a screw 29 is screwed into the closed-end hole from below in a state in which the screw 29 passes through the cover shielding member 27, the cover shielding member 27 is fixed to the cover 15.

Trunk Cable 12

As shown in FIG. 3, the trunk cable 12 includes three power trunk conductors 30 (an example of the trunk conductor) arranged in a rear portion of the trunk cable 12, two signal trunk conductors 31 (an example of the trunk conductor) that are arranged in a front portion of the trunk cable 12 and that are spaced apart from each other in the front-rear direction, and two ground trunk conductors 32 (an example of the trunk conductor) arranged at positions sandwiching the signal trunk conductors 31 from the front and the rear. The power trunk conductors 30, the signal trunk conductors 31, and the ground trunk conductors 32 are elongated in the right-left direction, and are arranged side-by-side and are spaced apart from each other in the front-rear direction. The power trunk conductors 30, the signal trunk conductors 31, and the ground trunk conductors 32 have a long and flat plate shape.

The power trunk conductors 30, the signal trunk conductors 31, and the ground trunk conductors 32 are made of an electrically conductive material. An example of the main component of the power trunk conductors 30, the signal trunk conductors 31, and the ground trunk conductors 32 is copper. More specifically, the power trunk conductors 30, the signal trunk conductors 31, and the ground trunk conductors 32 are preferably annealed copper wires.

FIG. 6 is an enlarged schematic cross-sectional view of a portion of the trunk cable 12, showing a region where the power trunk conductors 30 are arranged. Also, FIG. 7 is an enlarged schematic cross-sectional view of a portion of the trunk cable 12, showing a region where the signal trunk conductors 31 and the ground trunk conductors 32 are arranged. The power trunk conductors 30, the signal trunk conductors 31, and the ground trunk conductors 32 are arranged side-by-side and are spaced apart from each other in a state in which these trunk conductors are embedded in a conductor holding adhesive 33. The power trunk conductors 30, the signal trunk conductors 31, and the ground trunk conductors 32 are electrically insulated by the conductor holding adhesive 33.

Insulating films 34 (an example of an insulating trunk coating) are laminated on the upper side and the lower side of the conductor holding adhesive 33. Specifically, it is possible to use a film made of an insulating synthetic resin as the insulating film 34. Polyimide, polyester, polyphenylene sulfide, and the like can be suitably used as the synthetic resin, for example.

As shown in FIG. 6, the two power trunk conductors 30 arranged at positions closer to the rear portion of the trunk cable 12, and the power trunk conductor 30 arranged at a position closer to the front portion is arranged slightly apart from the others in the front-rear direction. The positioning holes 19A are formed in this region, avoiding the power trunk conductors 30.

As shown in FIG. 7, a conductive shield layer 35 (an example of a trunk shield) and an insulating layer 36 (an example of an insulating trunk coating) for covering the outer surface of the shield layer 35 are placed on the upper side of the insulating film 34 laminated on the upper side of the conductor holding adhesive 33 at positions corresponding to the signal trunk conductors 31 and the ground trunk conductors 32 that are arranged in the front portion of the trunk cable 12. The shield layer 35 is made of a conductive material. It is possible to use a metal film, a metal-vapor deposition film, a conductive woven fabric, or a conductive nonwoven fabric as the material of the shield layer 35, for example. Examples of components exerting the conductivity in the shield layer 35 include aluminum, copper, nickel, silver, and iron, and, in particular, copper and aluminum, which are relatively inexpensive and highly conductive, are suitable. Because the insulating layer 36 is similar to the above-described insulating film 34, its redundant description is omitted. Although not shown in detail, the shield layer 35 and the ground trunk conductors 32 are electrically connected to each other.

The shield layer 35 and the insulating layer 36 are also placed on the lower side of the insulating film 34 laminated on the lower side of the conductor holding adhesive 33. The shield layer 35 and the insulating layer 36 are the same as those placed on the upper side of the insulating film 34, and thus, these layers are given the same reference numerals, and their redundant description is omitted.

Branch Cable 13

As shown in FIG. 3, the branch cable 13 includes three power branch conductors 37 (an example of the branch conductor) arranged on the right side of the branch cable 13, two signal branch conductors 38 (an example of the branch conductor) that are arranged on the left side of the branch cable 13, and that are spaced apart from each other in the right-left direction, and two ground branch conductors 39 (an example of the branch conductor) arranged at positions sandwiching the signal branch conductors 38 from right and left. The power branch conductors 37, the signal branch conductors 38, and the ground branch conductors 39 are elongated in the right-left direction, and are arranged side-by-side and are spaced apart from each other in the front-rear direction. The power branch conductors 37, the signal branch conductors 38, and the ground branch conductors 39 have a long and flat plate shape.

The power branch conductors 37, the signal branch conductors 38, and the ground branch conductors 39 are made of an electrically conductive material. An example of the main component of the power branch conductors 37, the signal branch conductors 38, and the ground branch conductors 39 is copper. More specifically, the power branch conductors 37, the signal branch conductors 38, and the ground branch conductors 39 are preferably annealed copper wires.

Figure 8:
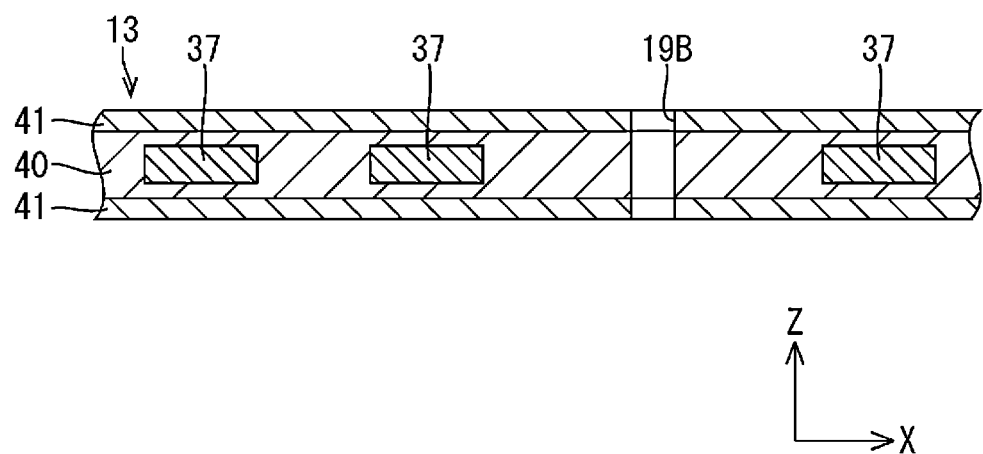
FIG. 8 is a schematic cross-sectional view showing a structure of a region of a branch cable in which power branch conductors are arranged.
Figure 9:
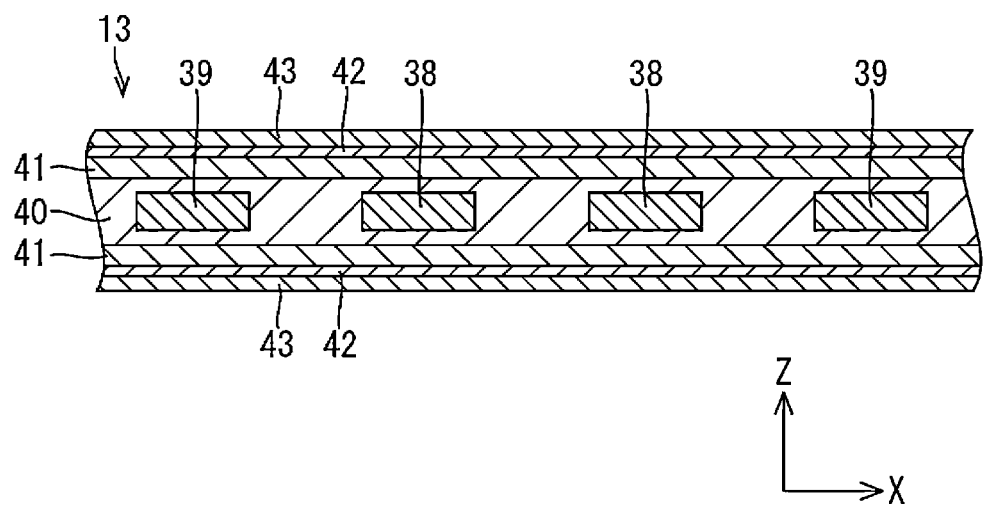
FIG. 9 is a schematic cross-sectional view showing a structure of a region of the branch cable in which signal branch conductors and ground branch conductors are arranged.

FIG. 8 is an enlarged schematic cross-sectional view of a portion of the branch cable 13, showing a region where the power branch conductors 37 are arranged. Also, FIG. 9 is an enlarged schematic cross-sectional view of a portion of the branch cable 13, showing a region where the signal branch conductors 38 and the ground branch conductors 39 are arranged. The power branch conductors 37, the signal branch conductors 38, and the ground branch conductors 39 are arranged side-by-side and are spaced apart from each other in a state in which these branch conductors are embedded in the conductor holding adhesive 40. The power branch conductors 37, the signal branch conductors 38, and the ground branch conductors 39 are electrically insulated by the conductor holding adhesive 40.

As shown in FIG. 8, the two power branch conductors 37 arranged at positions closer to a right end portion of the branch cable 13, and the power branch conductor 37 arranged at a position closer to its left end portion is arranged slightly apart from the others in the right-left direction. The positioning holes 19B are formed in this region, avoiding the power branch conductors 37.

Insulating films 41 (an example of an insulating branch coating) are laminated on the upper side and the lower side of the conductor holding adhesive 40. Specifically, it is possible to use a film made of an insulating synthetic resin as the insulating film 41. Polyimide, polyester, polyphenylene sulfide, and the like can be suitably used as the synthetic resin, for example.

As shown in FIG. 9, a conductive shield layer 42 (an example of a branch shield) and an insulating layer 43 (an example of an insulating branch coating) for covering the outer surface of the shield layer 42 are placed on the upper side of the insulating film 41 laminated on the upper side of the conductor holding adhesive 40 at positions corresponding to the signal branch conductors 38 and the ground branch conductors 39 that are arranged in the front portion of the branch cable 13. The shield layer 42 is made of a conductive material. It is possible to use a metal film, a metal-vapor deposition film, a conductive woven fabric, or a conductive nonwoven fabric as the material of the shield layer 42, for example. Examples of components exerting the conductivity in the shield layer 42 include aluminum, copper, nickel, silver, and iron, and, in particular, copper and aluminum, which are relatively inexpensive and highly conductive, are suitable. Because the insulating layer 43 on shield layer is similar to the above-described insulating film 41, its redundant description is omitted. Although not shown in detail, the shield layer 42 and the ground branch conductors 39 are electrically connected to each other.

The shield layer 42 and the insulating layer 43 are also placed on the lower side of the insulating film 41 laminated on the lower side of the conductor holding adhesive 40. The shield layer 42 and the insulating layer 43 are the same as those placed on the upper side of the insulating film 41, and thus, these layers are given the same reference numerals, and their redundant description is omitted.

Structure for Connecting Trunk Cable 12 and Branch Cable 13

Next, a structure for connecting the trunk cable 12 and the branch cable 13 (an example of a structure for connecting flexible flat cables) will be described. As shown in FIG. 3, on the bottom wall 11A of the case 11, the trunk cable 12 extends in the right-left direction at a position located slightly forward of the front end portion of the branch cable 13, which extends in the front-rear direction. The upper side of the trunk cable 12 is provided with a plurality (three in this embodiment) of power trunk opening portions 44 from which the power trunk conductors 30 are exposed due to the insulating film 34 being removed, at positions located slightly to the left of the left side edge of the branch cable 13, that is, at positions closer to its rear portion. The power trunk opening portions 44 have a rectangular shape that is elongated in its right-left direction. The power trunk opening portions 44 are arranged side-by-side and are spaced apart from each other in the front-rear direction. The power trunk conductors 30 exposed from the power trunk opening portions 44 can be regarded as power trunk lands 45.

The upper side of the trunk cable 12 is provided with a plurality (two in this embodiment) of signal trunk opening portions 46 from which the signal trunk conductors 31 are exposed due to the insulating film 34, the shield layer 35, and the insulating layer 36 being removed, and a plurality (two in this embodiment) of ground trunk opening portions 47 from which the ground trunk conductors 32 are exposed, at positions located slightly to the left of the left side edge of the branch cable 13, that is, at positions closer to its front portion. The signal trunk opening portions 46 and the ground trunk opening portions 47 have a rectangular shape that is elongated in the right-left direction, and are arranged side-by-side and are spaced apart from each other in the front-rear direction. The signal trunk conductors 31 exposed from the signal trunk opening portions 46 can be regarded as signal trunk lands 48. Also, the ground trunk conductors 32 exposed from the ground trunk opening portions 47 can be regarded as ground trunk lands 49.

The power trunk opening portions 44, the signal trunk opening portions 46, and the ground trunk opening portions 47 are formed using a known method such as punching, drilling, or laser processing, for example.

The upper side of the branch cable 13 is provided with a plurality (three in this embodiment) of power branch opening portions 50 from which the power branch conductors 37 are exposed due to the insulating film 34 being removed, at positions located slightly rearward of its front end portion. The power branch opening portions 50 have a rectangular shape that is elongated in the front-rear direction. The power branch opening portions 50 are arranged side-by-side and are spaced apart from each other in the right-left direction. The power branch conductors 37 exposed from the power branch opening portions 50 can be regarded as power branch lands 51.

The upper side of the branch cable 13 is provided with, at positions located on the left side of the power branch opening portions 50, a plurality of (two in this embodiment) of signal branch opening portions 52 from which the signal branch conductors 38 are exposed due to the insulating film 41, the shield layer 42, and the insulating layer 43 being removed, and a plurality (two in this embodiment) of ground branch opening portions 53 from which the ground branch conductors 39 are exposed. The signal branch opening portions 52 and the ground branch opening portions 53 have a rectangular shape that is elongated in the front-rear direction, and are arranged side-by-side and are spaced apart from each other in the right-left direction. The signal branch conductors 38 exposed from the signal branch opening portions 52 can be regarded as signal branch lands 54. Also, the ground branch conductors 39 exposed from the ground branch opening portions 53 can be regarded as ground branch lands 55.

The power branch opening portions 50, the signal branch opening portions 52, and the ground branch opening portions 53 can be formed using a method similar to that for the power trunk opening portions 44, the signal trunk opening portion 46, and the ground trunk opening portions 47.

Figure 10:
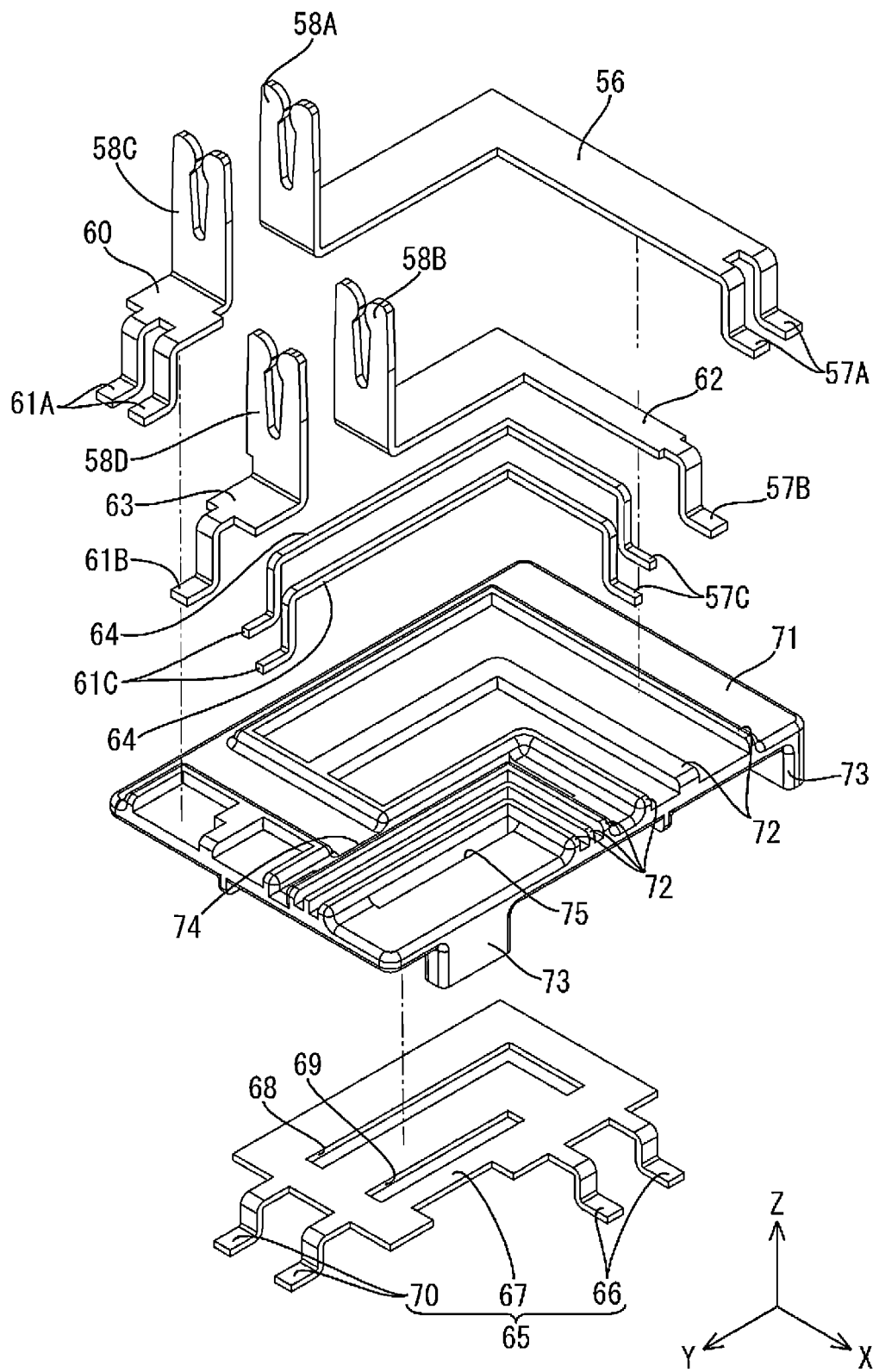
FIG. 10 is an exploded perspective view showing a conductive relay path, an insulating plate, and a base shielding member.
Figure 11:
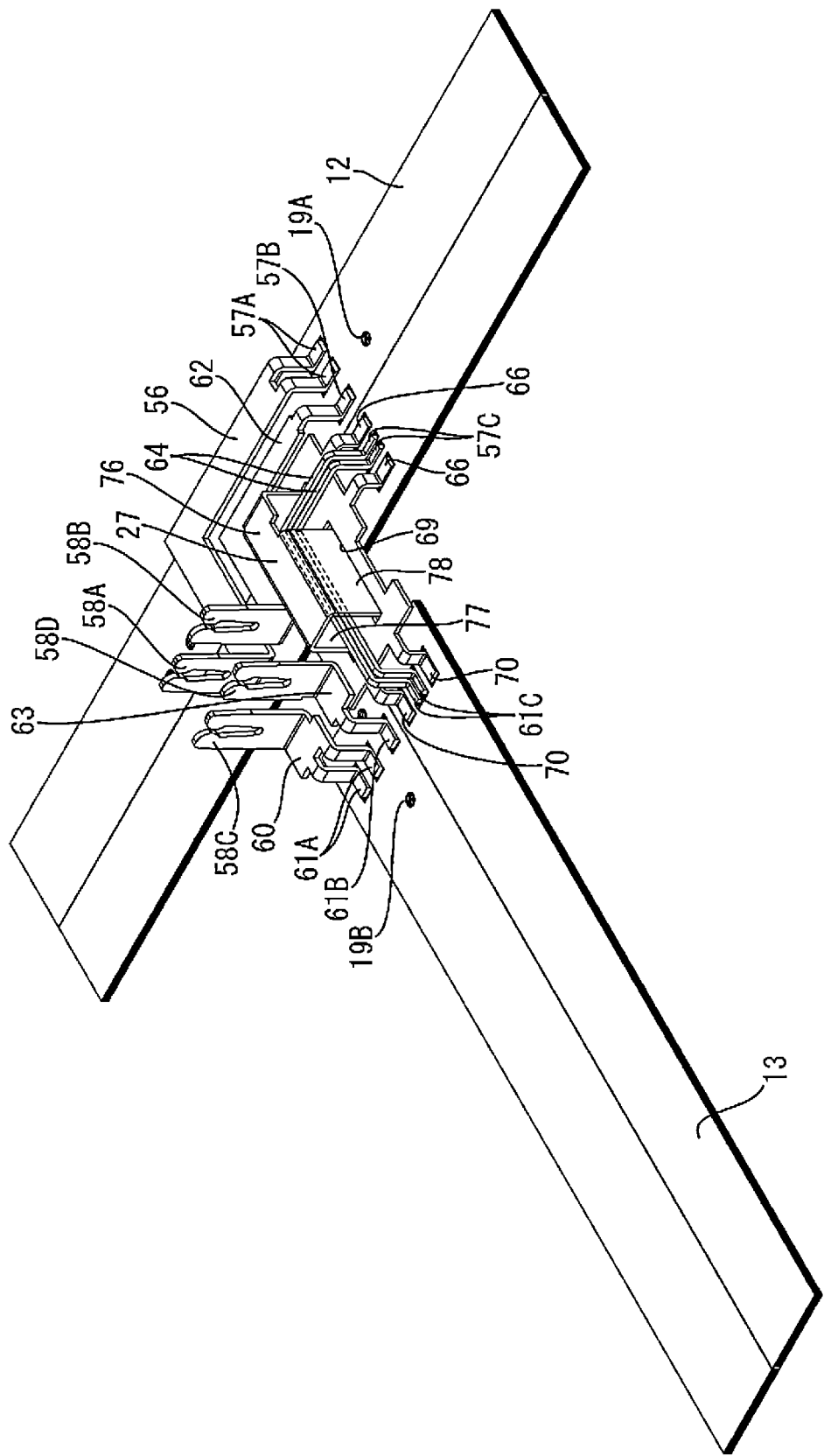
FIG. 11 is a perspective view showing a shielding structure of a relay bus bar, omitting the insulating plate.

As shown in FIGS. 10 and 11, out of the power trunk lands 45 formed on the trunk cable 12, the first and second power trunk lands 45 from the rear are connected to two trunk-side terminal portions 57A formed at a left end portion of a first trunk-side bus bar 56 (an example of the conductive relay path 14). The trunk-side terminal portions 57A are bent downward in a crank shape. The power trunk lands 45 and the trunk-side terminal portions 57A are electrically connected to each other, using a known method such as soldering, brazing, resistance welding, or laser welding. The first trunk-side bus bar 56 is bent in an L-shape when viewed from above. A front end portion of the first trunk-side bus bar 56 is bent upward and branches to two portions, and can be regarded as a fuse connection terminal portion 58A that is capable of holding a lead portion 59 of a fuse 26 (an example of the conductive relay path 14), which will be described later.

Out of the power branch lands 51 formed on the branch cable 13, the first and second power branch lands 51 from the right are connected to two branch-side terminal portions 61A formed at a front end portion of the first branch-side bus bar 60 (an example of the conductive relay path 14). The branch-side terminal portions 61A are bent downward in a crank shape. The power branch lands 51 and the branch-side terminal portions 61A are electrically connected to each other, using a known method such as soldering, brazing, resistance welding, or laser welding. The first branch-side bus bar 60 is bent in a crank shape when viewed from the side. A front end portion of the first branch-side bus bar 60 is bent upward and branches to two portions, and can be regarded as a fuse connection terminal portion 58C that is capable of holding a lead portion 59 of a fuse 26, which will be described later.

When the lead portion 59 of the fuse 26 is held by the fuse connection terminal portion 58A of the first trunk-side bus bar 56, and is held by the fuse connection terminal portion 58C of the first branch-side bus bar 60, the first trunk-side bus bar 56 and the first branch-side bus bar 60 are electrically connected to each other via the fuse 26.

Out of the power trunk lands 45 formed on the trunk cable 12, the third power trunk land 45 from the rear is connected to the trunk-side terminal portion 57B formed at a left end portion of the second trunk-side bus bar 62 (an example of the conductive relay path 14). The trunk-side terminal portion 57B is bent downward in a crank shape. The power trunk land 45 and the trunk-side terminal portion 57B are electrically connected to each other, using a known method such as soldering, brazing, resistance welding, or laser welding. The second trunk-side bus bar 62 is bent in an L-shape when viewed from above. A front end portion of the second branch-side bus bar 62 is bent upward and branches to two portions, and can be regarded as a fuse connection terminal portion 58B that is capable of holding a lead portion 59 of a fuse 26, which will be described later.

Out of the power branch lands 51 formed on the branch cable 13, the third power branch land 51 from the right is connected to a branch-side terminal portion 61B formed at a front end portion of the second branch-side bus bar 63 (an example of the conductive relay path 14). The branch-side terminal portion 61B is bent downward in a crank shape. The power branch land 51 and the branch-side terminal portion 61B are electrically connected to each other, using a known method such as soldering, brazing, resistance welding, or laser welding. The second branch-side bus bar 63 is bent in a crank shape when viewed from the side. A front end portion of the second branch-side bus bar 63 can be regarded as a fuse connection terminal portion 58D that is bent upward and branches to two portions, and that is capable of holding a lead portion 59 of a fuse 26, which will be described later.

The fuse connection terminal portions 58A, 58B, 58C, and 58D are arranged inside the fuse mounting portion 25 provided on the cover 15 in a state in which the cover 15 and the case 11 are assembled into a single body.

When the lead portions 59 of the fuse 26 are held by the fuse connection terminal portion 58B of the second trunk-side bus bar 62 and by the fuse connection terminal portion 58D of the second branch-side bus bar 63, the second trunk-side bus bar 62 and the second branch-side bus bar 63 are electrically connected to each other via the fuse 26.

The signal trunk lands 48 formed on the trunk cable 12 are electrically connected to the signal branch lands 54 formed on the branch cable 13 via the relay bus bars 64 (an example of the conductive relay path 14). Accordingly, the signal trunk conductors 31 of the trunk cable 12 and the signal branch conductors 38 of the branch cable 13 are electrically connected to each other. In this embodiment, the two signal trunk lands 48 provided on the trunk cable 12 and the two signal branch lands 54 provided on the branch cable 13 are respectively connected to each other by the two relay bus bars 64.

Each relay bus bar 64 includes a trunk-side terminal portion 57C connected to the signal trunk land 48, and a branch-side terminal portion 61C connected to the signal branch land 54. In this embodiment, the two relay bus bars 64 are spaced apart from each other. The relay bus bars 64 are bent in an L-shape when viewed from above. The branch-side terminal portions 57C and the branch-side terminal portions 61C are bent downward in a crank shape.

The signal trunk lands 48 and the trunk-side terminal portions 57C are electrically connected to each other, using a known method such as soldering, brazing, resistance welding, or laser welding. Also, the signal branch lands 54 and the branch-side terminal portions 61C are electrically connected to each other, using a known method such as soldering, brazing, resistance welding, or laser welding.

The two ground trunk lands 49 formed on the trunk cable 12 are respectively connected to two trunk-side ground terminal portions 66 formed at the left end portion of a base shielding member 65 (an example of the shielding member). The trunk-side ground terminal portions 66 are bent downward in a crank shape. The ground trunk lands 49 and the trunk-side ground terminal portions 66 are electrically connected to each other, using a known method such as soldering, brazing, resistance welding, or laser welding. The base shielding member 65 includes a base plate portion 67 having a substantially rectangular shape when viewed from above. The above-described trunk-side ground terminal portions 66 are bent downward from the base plate portion 67 in a crank shape. The base plate portion 67 includes a shield-side first slit 68 that is bent in an L-shape when viewed from above, and a shield-side second slit 69 that extends in the front-rear direction when viewed from above, at a position located on the left side of the shield-side first slit 68.

The two ground branch lands 55 formed on the branch cable 13 are respectively connected to the two branch-side ground terminal portions 70 formed at the front end portion of the base shielding member 65. The branch-side ground terminal portions 70 are bent downward from the base plate portion 67 in a crank shape. The ground branch lands 55 and the branch-side ground terminal portions 70 are electrically connected to each other, using a known method such as soldering, brazing, resistance welding, or laser welding.

The first trunk-side bus bar 56, the first branch-side bus bar 60, the second trunk-side bus bar 62, the second branch-side bus bar 63, and the relay bus bars 64 are arranged on an upper side of the insulating plate 71, which is made of an insulating synthetic resin. The upper side of the insulating plate 71 is provided with multiple lines of ribs 72 that protrude upward. The first trunk-side bus bar 56, the first branch-side bus bar 60, the second trunk-side bus bar 62, the second branch-side bus bar 63, and the relay bus bars 64 are electrically insulated from each other due to these ribs 72 being interposed between them.

As shown in FIG. 10, the lower side of the insulating plate 71 is provided with a plurality of legs 73 that protrude downward. Due to these legs 73, the insulating plate 71 is spaced apart from the bottom wall 11A of the case 11 in a state in which the insulating plate 71 is placed on the bottom wall 11A of the case 11.

The base shielding member 65 is arranged on the lower side of the insulating plate 71. The base plate portion 67 of the base shielding member 65 is arranged at a position overlapping the two relay bus bars 64 via the insulating plate 71, when viewed from above. The insulating plate 71 is provided with an insulating plate-side first slit 74 and an insulating plate-side second slit 75, respectively at positions that correspond to a shield-side first slit 68 and a shield-side second slit 69 of the base shielding member 65 when the base shielding member 65 is arranged on the insulating plate 71.

The insulating plate 71, the first trunk-side bus bar 56, the first branch-side bus bar 60, the second trunk-side bus bar 62, the second branch-side bus bar 63, and the relay bus bars 64, and the base shielding member 65 are fixed using a known method such as gluing or heat welding.

The cover shielding member 27 (an example of the shielding member) screwed to the cover 15 is arranged above the insulating plate 71. The cover shielding member 27 includes an upper wall 76, and a first side wall 77 and a second side wall 78 that extend downward from side edges of the upper wall 76. The first side wall 77 is bent in an L-shape when viewed from above. The first side wall 77 has a shape corresponding to the above-described shield-side first slit 68 and insulating plate-side first slit 74, and the lower end portion of the first side wall 77 is inserted into the shield-side first slit 68 and the insulating plate-side first slit 74 from above, and passes through the insulating plate 71 downward.

The second side wall 78 extends in the front-rear direction when viewed from above. The second side wall 78 has a shape corresponding to the above-described shield-side second slit 69 and insulating plate-side second slit 75, and the lower end portion of the second side wall 78 is inserted into the shield-side second slit 69 and the insulating plate-side second slit 75 from above, and passes through the insulating plate 71 downward.

The base shielding member 65 is arranged below the relay bus bars 64 via the insulating plate 71, and the cover shielding member 27 is arranged above and on the sides of the relay bus bars 64 in a state in which the cover 15 is mounted on the case 11. Accordingly, the relay bus bars 64 are enclosed by the base shielding member 65 and the cover shielding member 27. In this embodiment, the base shielding member 65 and the cover shielding member 27 are not electrically connected to each other.

The first trunk-side bus bar 56, the first branch-side bus bar 60, the second trunk-side bus bar 62, the second branch-side bus bar 63, the relay bus bars 64, the base shielding member 65, and the cover shielding member 27 have predetermined shapes obtained by pressing a metal plate. The metal plate may be selected from metals such as copper, copper alloys, aluminum, and aluminum alloys as needed. A plating layer may also be formed on the surfaces of the first trunk-side bus bar 56, the first branch-side bus bar 60, the second trunk-side bus bar 62, the second branch-side bus bar 63, the relay bus bars 64, the base shielding member 65, and the cover shielding member 27. Metal constituting a plating layer may be selected from metals such as tin and nickel as needed.

Example of Manufacturing Process in this Embodiment

Next, an example of a process for manufacturing the branch box 10 according to this embodiment will be described below. Note that the process for manufacturing the branch box 10 is not limited to the following description.

The case 11 and the cover 15 are formed through injection molding with a synthetic resin. Also, the insulating plate 71 is formed through injection molding with a synthetic resin.

The power trunk opening portions 44, the signal trunk opening portions 46, and the ground trunk opening portions 47 are formed in the upper surface of the trunk cable 12 and respectively expose the power trunk lands 45, the signal trunk lands 48, and the ground trunk lands 49.

The power branch opening portions 50, the signal branch opening portions 52, and the ground branch opening portions 53 are formed in the upper surface of the branch cable 13 and respectively expose the power branch lands 51, the signal branch lands 54, and the ground branch lands 55.

Figure 12:
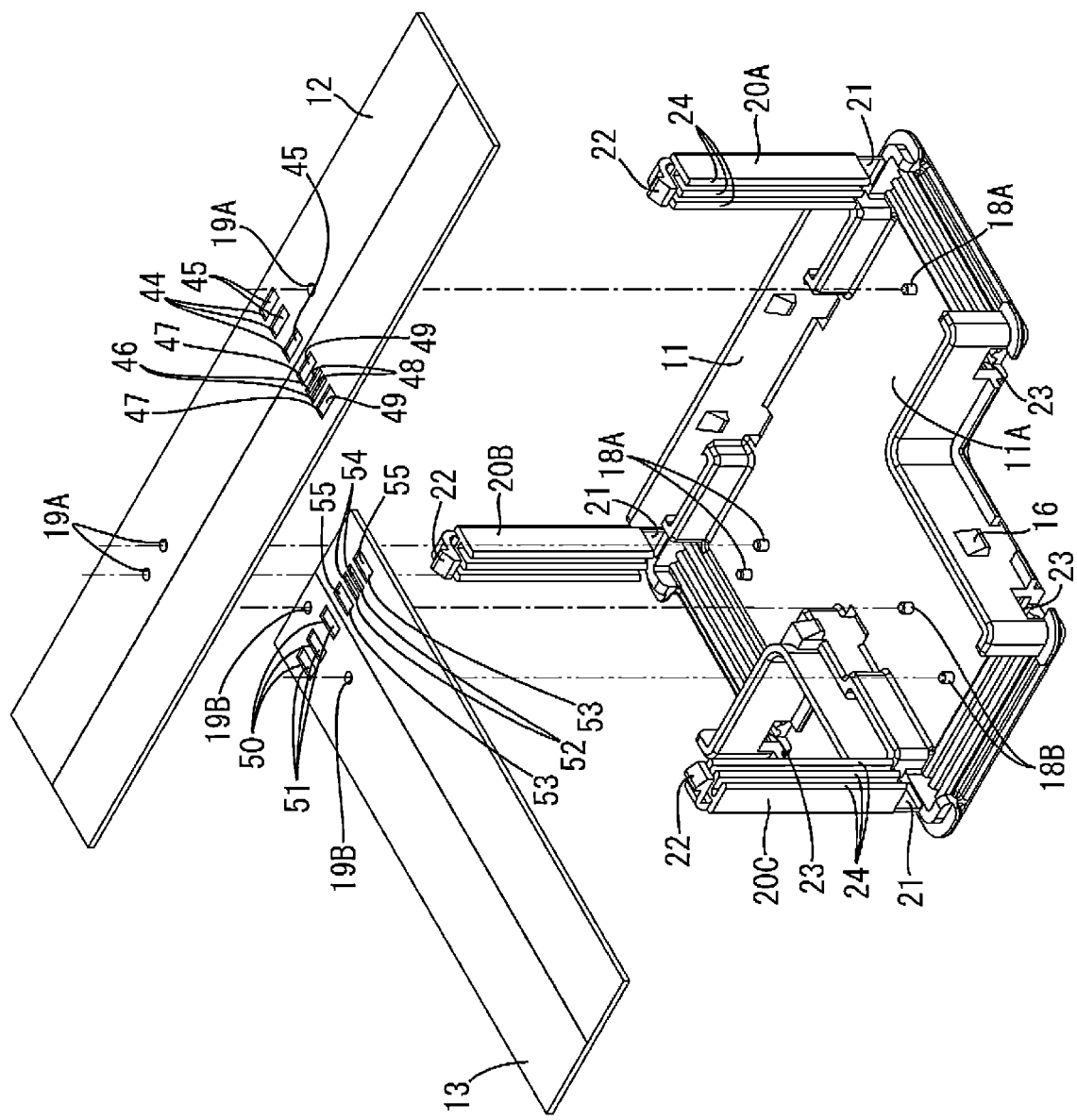
FIG. 12 is a perspective view showing a process for arranging a trunk cable and a branch cable on a case.

As shown in FIG. 12, the left holding portion 20A, the right holding portion 20B, and the branch holding portion 20C that are provided in the case 11 are flipped upward by rotating them around the hinges 21.

As shown in FIG. 12, the trunk cable 12 is placed on the rear portion of the case 11. At this time, the positioning pins 18A of the case 11 are inserted into the positioning holes 19A of the trunk cable 12. Accordingly, the trunk cable 12 is placed on the case 11 in a state in which the trunk cable 12 is positioned relative to the case 11.

The branch cable 13 is placed on a front portion of the case 11. At this time, the positioning pins 18B of the case 11 are inserted into the positioning holes 19B of the branch cable 13. Accordingly, the branch cable 13 is placed on the case 11 in a state in which the branch cable 13 is positioned relative to the case 11.

Figure 13:
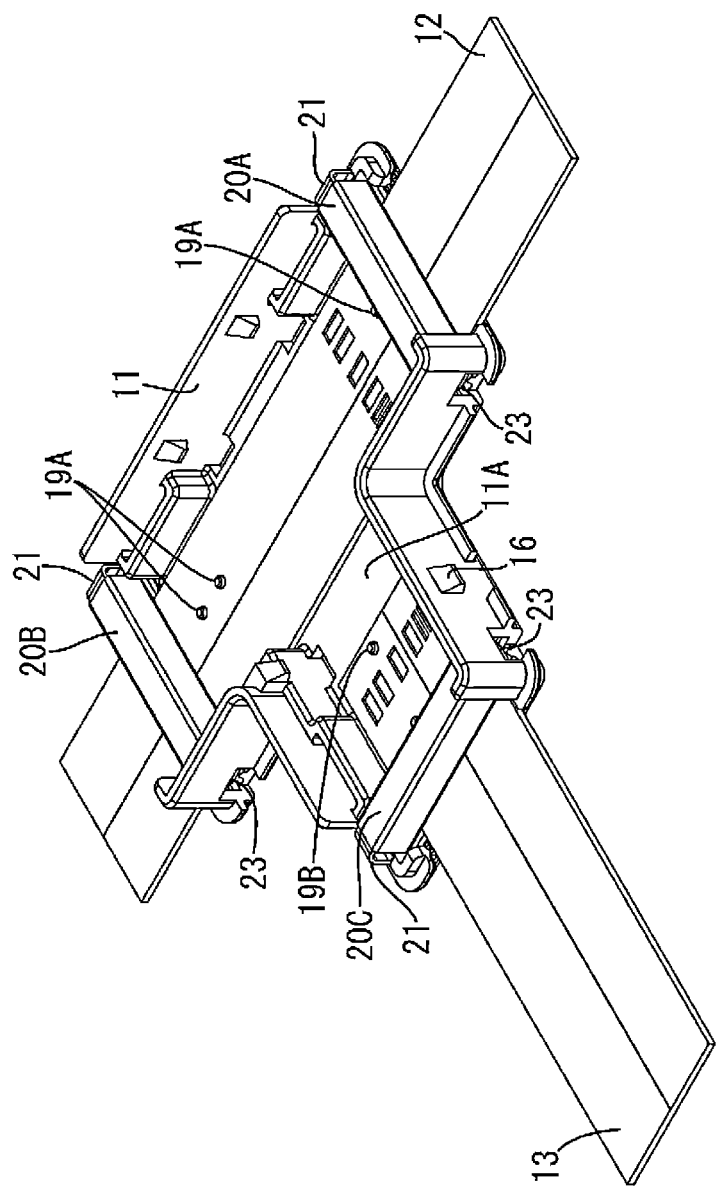

As shown in FIG. 13, the left holding portion 20A and the right holding portion 20B are moved toward the bottom wall 11A of the case 11 by rotating them around the hinges 21. The locking claws 22 of the left holding portion 20A and the right holding portion 20B, and the locked portions 23 of the case 11 are elastically engaged with each other. Accordingly, the trunk cable 12 is held between the left holding portion 20A and the right holding portion 20B, and the bottom wall 11A of the case 11.

The branch holding portion 20C is moved toward the bottom wall 11A of the case 11 by rotating the branch holding portion 20C around the hinge 21. The locking claws 22 of the branch holding portion 20C, and the locked portions 23 of the case 11 are elastically engaged with each other. Accordingly, the branch cable 13 is held between the branch holding portion 20C and the bottom wall 11A of the case 11.

Solder paste is applied, using a known method such as screen printing, onto the upper surfaces of the power trunk lands 45, the signal trunk lands 48, the ground trunk lands 49, the power branch lands 51, the signal branch lands 54, and the ground branch lands 55.

The first trunk-side bus bar 56, the first branch-side bus bar 60, the second trunk-side bus bar 62, the second branch-side bus bar 63, the relay bus bars 64, the base shielding member 65, and the cover shielding member 27 are formed by pressing a metal plate.

The first trunk-side bus bar 56, the first branch-side bus bar 60, the second trunk-side bus bar 62, the second branch-side bus bar 63, and the relay bus bars 64 are arranged on the upper side of the insulating plate 71, and the base shielding member 65 is arranged on the lower side of the insulating plate 71, and they are fixed to the insulating plate 71 through heat welding.

Figure 14:
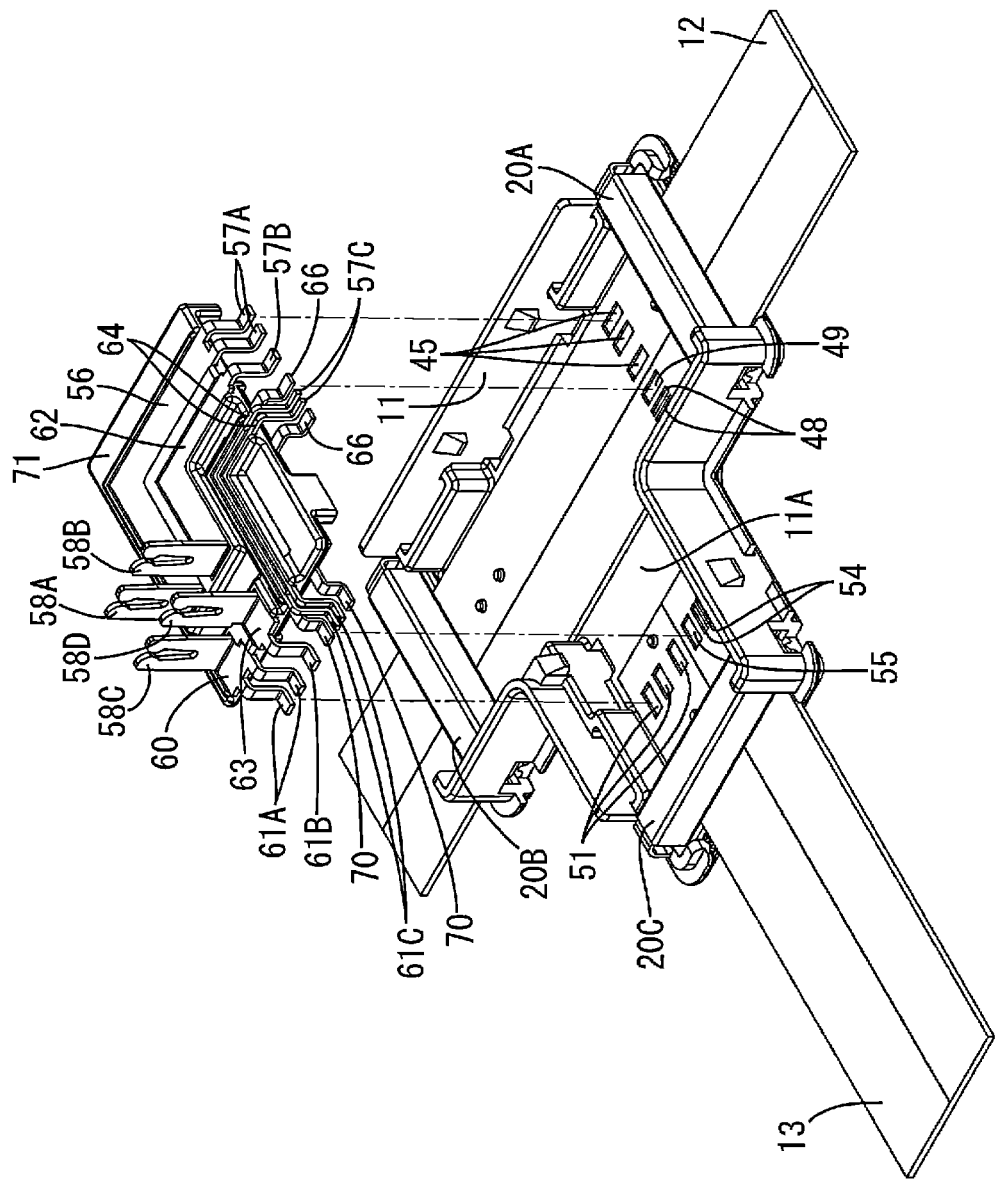
FIG. 14 is a perspective view showing a process for attaching a conductive relay path to the trunk cable and the branch cable.
Figure 16:
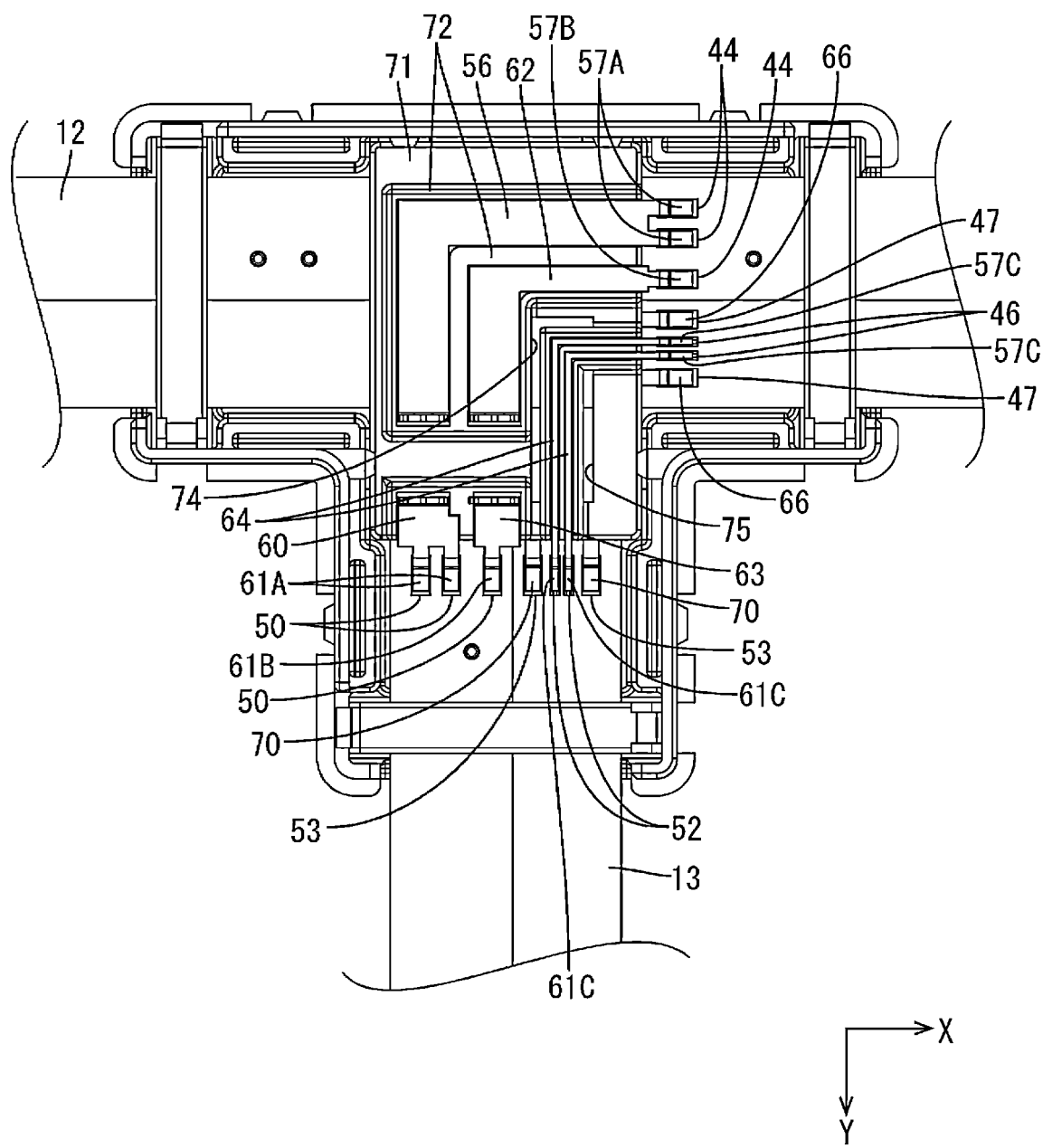
FIG. 16 is a plan view showing a state in which the trunk cable, the branch cable, and the conductive relay path are mounted on the case.

As shown in FIGS. 14 and 16, an assembly in which the first trunk-side bus bar 56, the first branch-side bus bar 60, the second trunk-side bus bar 62, the second branch-side bus bar 63, the relay bus bars 64, and the base shielding member 65 are fixed to the insulating plate 71 is placed on the trunk cable 12 and the branch cable 13 that are placed on the case 11. This operation may be performed by an operator, or a machine such as a mounter, for example.

Lower end portions of the trunk-side terminal portions 57A and 57B of the first trunk-side bus bar 56 and the second trunk-side bus bar 62 are placed on the power trunk lands 45, lower end portions of the trunk-side terminal portions 57C of the relay bus bars 64 are placed on the signal trunk lands 48, and lower end portions of the trunk-side ground terminal portions 66 of the base shielding member 65 are placed on the ground trunk lands 49.

Also, lower end portions of the branch-side terminal portions 61A and 61B of the first branch bus bar and the second branch bus bar are placed on the power branch lands 51, lower end portions of the branch-side terminal portions 61C of the relay bus bars 64 are placed on the signal branch lands 54, and lower end portions of the branch-side ground terminal portions 70 of the base shielding member 65 are placed on the ground branch lands 55.

The power trunk lands 45 are soldered to the lower end portions of the trunk-side terminal portions 57A and 57B of the first trunk-side bus bar 56 and the second trunk-side bus bar 62, the signal trunk lands 48 are soldered to the lower end portions of the trunk-side terminal portions 57C of the relay bus bars 64, and the ground trunk lands 49 are soldered to the lower end portions of the trunk-side ground terminal portions 66 of the base shielding member.

Also, the power branch lands 51 are soldered to the lower end portions of the branch-side terminal portions 61A and 61B of the first branch bus bar and the second branch bus bar, the signal branch lands 54 are soldered to the lower end portions of the branch-side terminal portions 61C of the relay bus bars 64, and the ground branch lands 55 are soldered to the lower end portions of the branch-side ground terminal portions 70 of the base shielding member 65.

Soldering may be performed by an operator using a soldering iron, or may also be performed through known reflow soldering, and any methods can be selected as needed.

As shown in FIG. 5, the cover shielding member 27 is screwed onto the lower side of the upper plate of the cover 15 by the screw 29.

Figure 15:
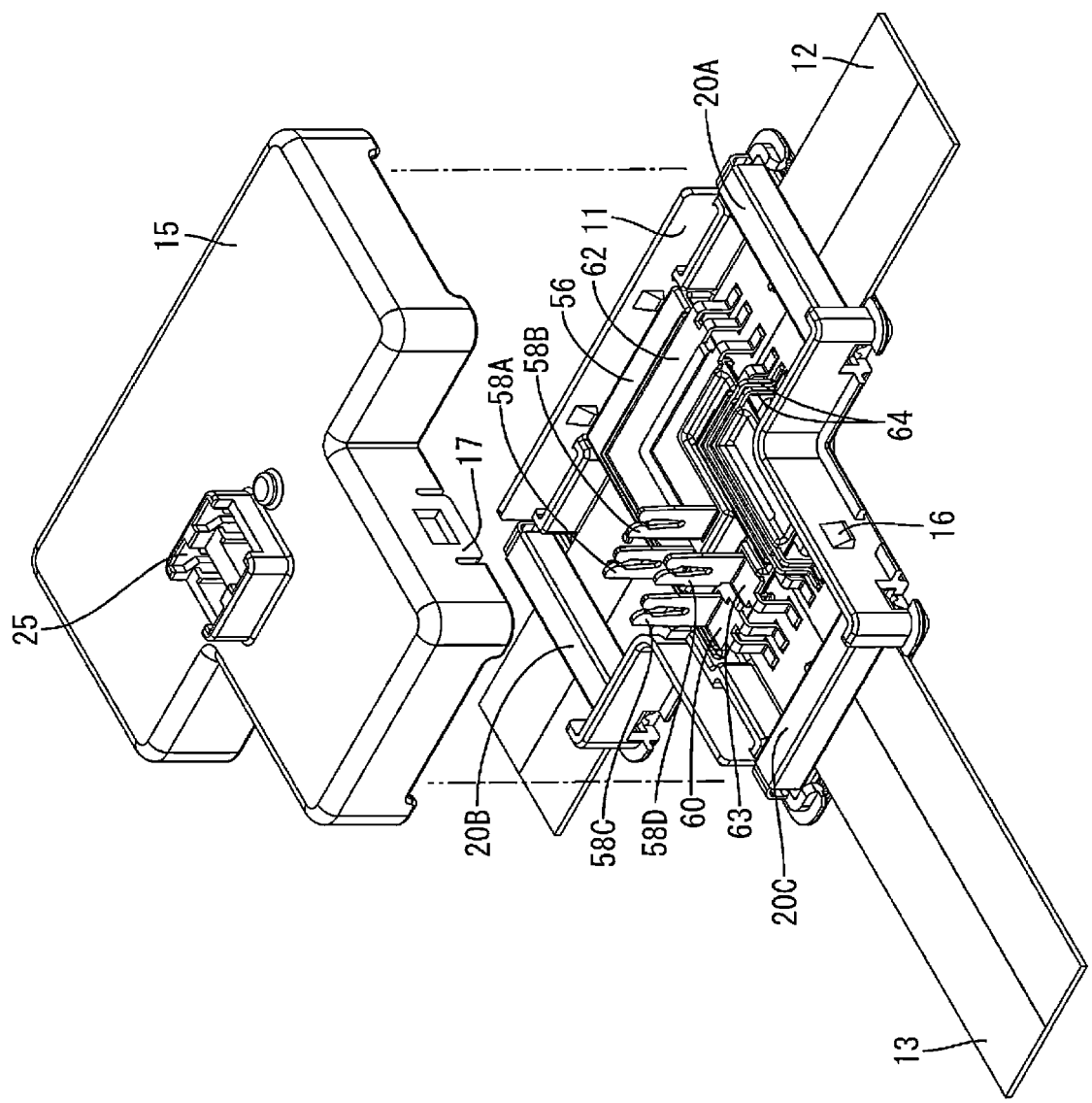
FIG. 15 is a perspective view showing a process for attaching a cover to the case on which the trunk cable, the branch cable, and the conductive relay path are mounted.

As shown in FIG. 15, the cover 15 is mounted on the case 11 from above. The case 11 and the cover 15 are assembled into a single body through elastic engagement between the locking portions 16 provided on the side walls of the case 11 and the locking reception portions 17 provided on the side walls of the cover 15.

Figure 17:
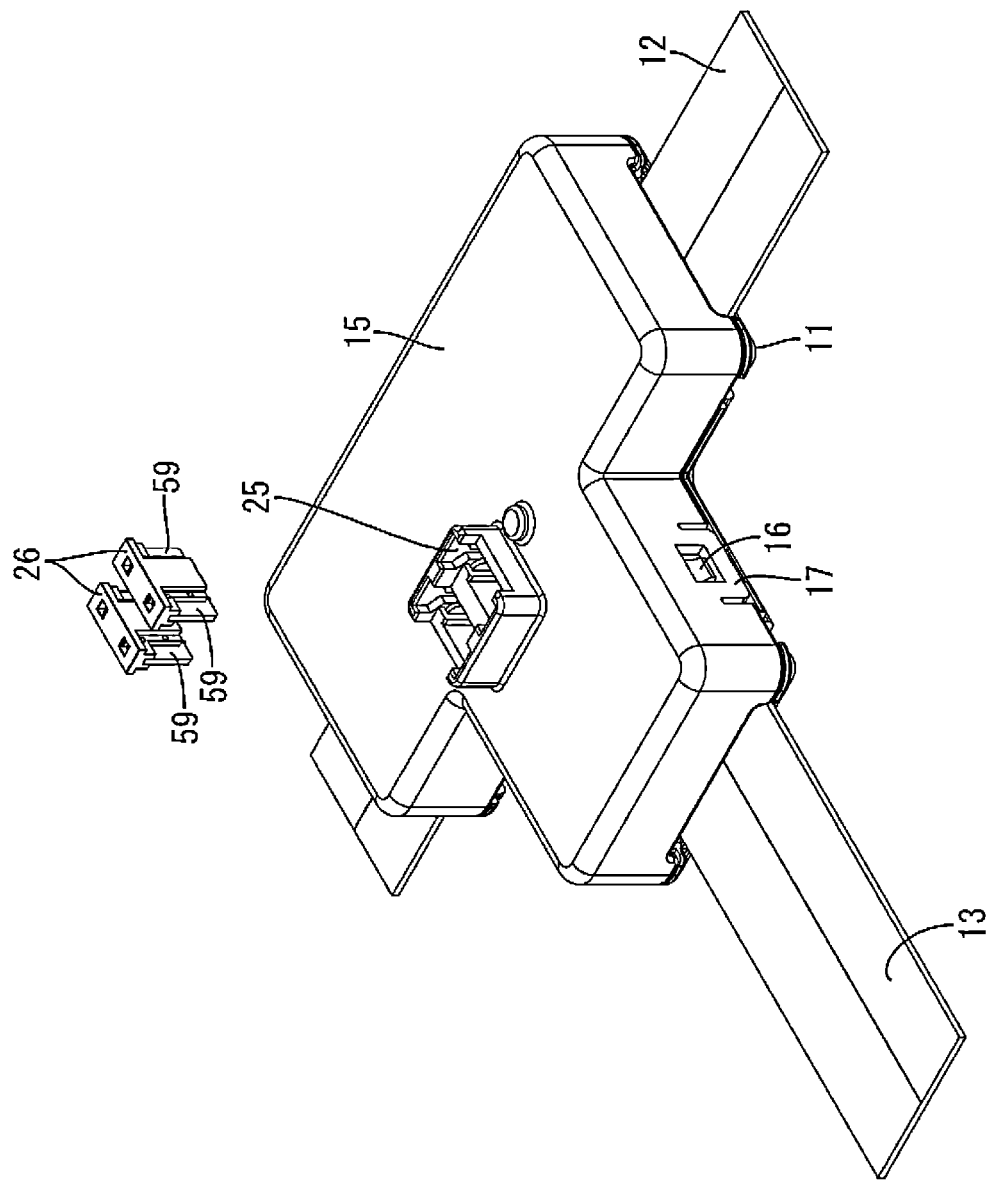
FIG. 17 is a perspective view showing a process for mounting fuses on a fuse mounting portion.
Figure 18:
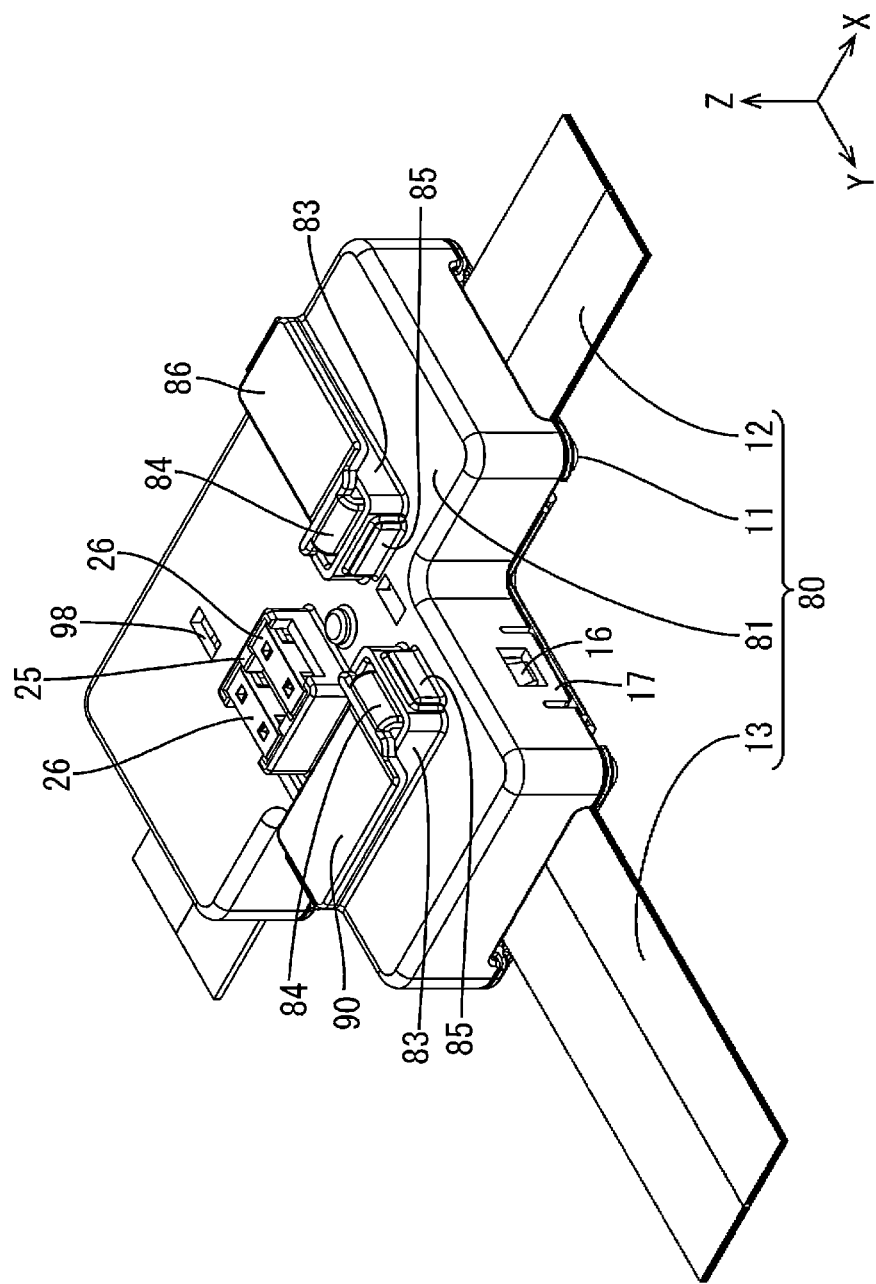
FIG. 18 is a perspective view showing a branch box according to Embodiment 2.

As shown in FIG. 17, the two fuses 26 are mounted on the fuse mounting portion 25 provided on the cover 15 from above. When the leads of the fuses 26 are held by fuse connection terminal portions 58A, 58B, 58C, and 58D, one fuse 26 is electrically connected to the first trunk-side bus bar 56 and the first branch-side bus bar 60, and the other fuse 26 is electrically connected to the second trunk-side bus bar 62 and the second branch-side bus bar 63. Accordingly, the branch box 10 according to this embodiment is complete (see FIG. 1). The branch box 10 can be arranged in a vehicle in any orientation.

Effects of this Embodiment

Next, effects of this embodiment will be described below. A structure for connecting the trunk cable 12 and the branch cable 13 according to this embodiment includes the trunk cable 12, the branch cable 13, and the conductive relay path 14. The trunk cable 12 includes power trunk conductors 30, signal trunk conductors 31, insulating films 34 for covering the power trunk conductors 30, insulating films 34 and insulating layers 36 for covering the signal trunk conductors 31. The branch cable 13 includes power branch conductors 37, signal branch conductors 38, insulating films 41 covering the power branch conductors 37, insulating films 41 and insulating layers 43 covering the signal trunk conductors 38.

The power trunk conductors 30 and the power branch conductors 37 are electrically connected to each other by the first trunk-side bus bar 56, the fuse 26, and the first branch-side bus bar 60, and are electrically connected to each other by the second trunk-side bus bar 62, the fuse 26, and the second branch-side bus bar 63. The signal trunk conductors 31 and the signal branch conductors 38 are electrically connected to each other by the relay bus bars 64.

The power trunk conductors 30 include the power trunk lands 45 exposed from the power trunk opening portion 44 provided in the insulating film 34, and the power branch conductors 37 include the power branch lands 51 exposed from a power branch opening portion 50 provided in the insulating film 41. The first trunk-side bus bar 56 includes the trunk-side terminal portions 57A connected to the power trunk lands 45, and the second trunk-side bus bar 62 includes the trunk-side terminal portion 57B. The first branch-side bus bar 60 has the branch-side terminal portions 61A connected to the power branch land 51, and the second branch-side bus bar includes the branch-side terminal portion 61B connected to the power branch land 51.

The signal trunk conductors 31 include the signal trunk lands 48 exposed from the signal trunk opening portion 46 provided in the insulating film 34, the shield layer 35, and the insulating layer 36. The signal branch conductors 38 include the signal branch lands 54 exposed from the signal branch opening portion 52 provided in the insulating film 34, the shield layer 35, and the insulating layer 36. The relay bus bars 64 include the trunk-side terminal portions 57C connected to the signal trunk land 48, and the branch-side terminal portion 61C connected to the signal branch land 54.

According to the above-described configuration, the power trunk lands provided on the power trunk conductors 30 and the trunk-side terminal portions 57A and 57B are connected to each other, and the power branch lands 51 provided on the power branch conductors 37 and the branch-side terminal portions 61A and 61B are connected to each other. Also, the signal trunk lands 48 provided on the signal trunk conductors 31 and the trunk-side terminal portions 57C are connected to each other, and the signal branch lands 54 provided on the signal branch conductors 38 and the branch-side terminal portions 61C are connected to each other. Accordingly, compared to a case where a plurality of flexible flat cables are connected to each other by inserting a connection member into the conductors, it is possible to electrically connect the power trunk conductors 30 of the trunk cable 12 and the power branch conductors 37 of the branch cable 13 in a larger area, and it is also possible to electrically connect the signal trunk conductors 31 of the trunk cable 12 and the signal branch conductors 38 of the branch cable 13. As a result, it is possible to improve the reliability of electrical connection between the trunk cable 12 and the branch cable 13.

In this embodiment, the signal trunk conductors 31 of the trunk cable 12 and the signal branch conductors 38 of the branch cable 13 can be electrically connected to each other by the relay bus bars 64.

In this embodiment, the power trunk conductors 30 of the trunk cable 12 and the power branch conductors 37 of the branch cable 13 can be electrically connected to each other, via the fuse 26, by the first trunk-side bus bar 56, which includes the trunk-side terminal portions 57A, the fuse 26 connected to the fuse connection terminal portion 58A provided on the first trunk-side bus bar 56, and the first branch-side bus bar 60 that includes the fuse connection terminal portion 58C connected to the fuse 26 and the branch-side terminal portions 61A. Also, the power trunk conductors 30 of the trunk cable 12 and the power branch conductors 37 of the branch cable 13 can be electrically connected to each other, via the fuse 26, by the second trunk-side bus bar 62 that includes the trunk-side terminal portion 57B, the fuse 26 connected to the fuse connection terminal portion 58B provided on the second trunk-side bus bar 62, and the second branch-side bus bar 63 that includes the fuse connection terminal portion 58D connected to the fuse 26 and the branch-side terminal portion 61B.

According to the above-described configuration, it is possible to inhibit overcurrent from flowing between the trunk cable 12 and the branch cable 13.

According to this embodiment, the first trunk-side bus bar 56, the first branch-side bus bar 60, the second trunk-side bus bar 62, the second branch-side bus bar 63, and the relay bus bars 64 are mounted on the insulating plate 71, which is made of an insulating synthetic resin.

According to the above-described configuration, when the insulating plate 71 on which the first trunk-side bus bar 56, the first branch-side bus bar 60, the second trunk-side bus bar 62, the second branch-side bus bar 63, and the relay bus bars 64 are mounted is placed at a predetermined position of the trunk cable 12 and the branch cable 13, the trunk-side terminal portions 57A and 57B can be placed on the power trunk lands 45 and the signal trunk lands 48, and the branch-side terminal portions 61A and 61B can be placed on the power branch lands 51 and the signal branch lands 54. As a result, it is possible to improve the efficiency of operations for connecting the first trunk-side bus bar 56 and the second trunk-side bus bar 62 to the power trunk lands 45, and operations for connecting the first branch-side bus bar 60 and the second branch-side bus bar 63 to the power branch lands 51. Also, it is possible to improve the efficiency of operations for connecting the relay bus bars 64, the signal trunk lands 48, and the signal branch lands 54.

The structure for connecting the trunk cable 12 and the branch cable 13 according to this embodiment includes the trunk cable 12, which includes the signal trunk conductors 31; the ground trunk conductors 32; the shield layer 35 that is electrically connected to the ground trunk conductors 32 and encloses the signal trunk conductors 31 to electromagnetically shield the signal trunk conductors 31; and the insulating layer 36 for covering the signal trunk conductors 31, the ground trunk conductors 32, and the shield layer 35, and the branch cable 13, which includes the signal branch conductors 38; the ground branch conductors 39; the shield layer 42 that is electrically connected to the ground branch conductors 39 and encloses the signal branch conductors 38 to electromagnetically shield the signal branch conductors 38; and the insulating layer 43 for covering the signal branch conductors 38, the ground branch conductors 39, and the shield layer 42, the relay bus bars 64, which include the trunk-side terminal portions 57C connected to the signal trunk conductors 31, and the branch-side terminal portions 61C connected to the signal branch conductors 38, and the base shielding member 65 and the cover shielding member 27 for enclosing the relay bus bars 64 to electromagnetically shield the relay bus bars 64.

According to the above-described configuration, it is possible to electromagnetically shield the relay bus bars 64 by the base shielding member 65 and the cover shielding member 27. Accordingly, the signal trunk conductors 31 of the trunk cable 12 and the signal branch conductors 38 of the branch cable 13 are electrically connected to each other in a state in which these conductors are electromagnetically shielded.

Also, according to this embodiment, the base shielding member 65 includes the trunk-side ground terminal portions 66 connected to the ground trunk conductors 32, and the branch-side ground terminal portions 70 connected to the ground branch conductors 39. Accordingly, it is possible to improve shield performance for the relay bus bars 64.

Also, according to this embodiment, it is possible to shield the relay bus bars 64 by connecting the base shielding member 65 to the ground trunk conductors 32 and the ground branch conductors 39, and arranging the relay bus bars 64 between the base shielding member 65 and the cover shielding member 27.

The branch box 10 according to this embodiment includes the case 11, the trunk cable 12 fixed to the case 11, the branch cable 13 fixed to the case 11 in a state in which the branch cable 13 is electrically connected to the trunk cable 12, and the cover 15 that is mounted on the case 11 and covers the trunk cable 12 and the branch cable 13.

The branch cable 12 includes the power branch conductors 30 and the insulating films 34 covering the power trunk conductors 30, and the branch cable 13 includes the power branch conductors 37 and the insulating films 41 covering the power branch conductors 37. The conductive relay path 14 (the first trunk-side bus bar 56, the second trunk-side bus bar 62, the fuses 26, the first branch-side bus bar 60, and the second branch-side bus bar 63) is electrically connected to the power trunk lands 45 in the power trunk conductors 30 that are exposed from the power trunk opening portions 44 provided in the insulating films 34, and, the power branch lands 51 in the power branch conductors 37 that are exposed from the power branch opening portions 50 provided in the insulating films 41.

Also, the trunk cable 12 includes the signal trunk conductors 31, and the insulating films 34 and the insulating layers 36 covering the signal trunk conductors 31, and the branch cable 13 includes the signal branch conductors 38, and the insulating films 41 and the insulating layers 43 covering the signal branch conductors 38. The conductive relay path 14 (the relay bus bars 64) is electrically connected to the signal trunk lands 48 in the signal trunk conductors 31, which are exposed from the signal trunk opening portions 46 provided in the insulating films 34 and the insulating layers 36, and the signal branch lands 54 in the signal branch conductors 38, which are exposed from the signal branch opening portions 52 provided in the insulating films 41 and the insulating layers 43.

According to the above-described configuration, when the trunk cable 12 and the branch cable 13 are fixed to the case 11, it is possible to electrically connect the trunk cable 12 and the branch cable 13 by the conductive relay path 14 in a state in which the trunk cable 12 is positioned relative to the branch cable 13.

According to this embodiment, the case 11 includes the bottom wall 11A, and the left holding portion 20A and the right holding portion 20B for holding the trunk cable 12 between the case 11 and the bottom wall 11A, and the branch holding portion 20C for holding the branch cable 13 between the case 11 and the bottom wall 11A.

According to the above-described configuration, it is possible to fix the trunk cable 12 to the case 11 by the left holding portion 20A and the right holding portion 20B, and to fix the branch cable 13 to the case 11 by the branch holding portion 20C.

According to this embodiment, the case 11 has the positioning pins 18A and 18B protruding from the bottom wall 11A, positioning holes 19A pass through the trunk cable 12, and the positioning holes 19B pass through the branch cable 13.

According to the above-described configuration, it is possible to reliably fix the trunk cable 12 and the branch cable to the case 11.

Embodiment 2

Next, a branch box 80 according to Embodiment 2 of technology disclosed in this specification will be described with reference to FIGS. 18 to 25.

Cover 81

Figure 19:
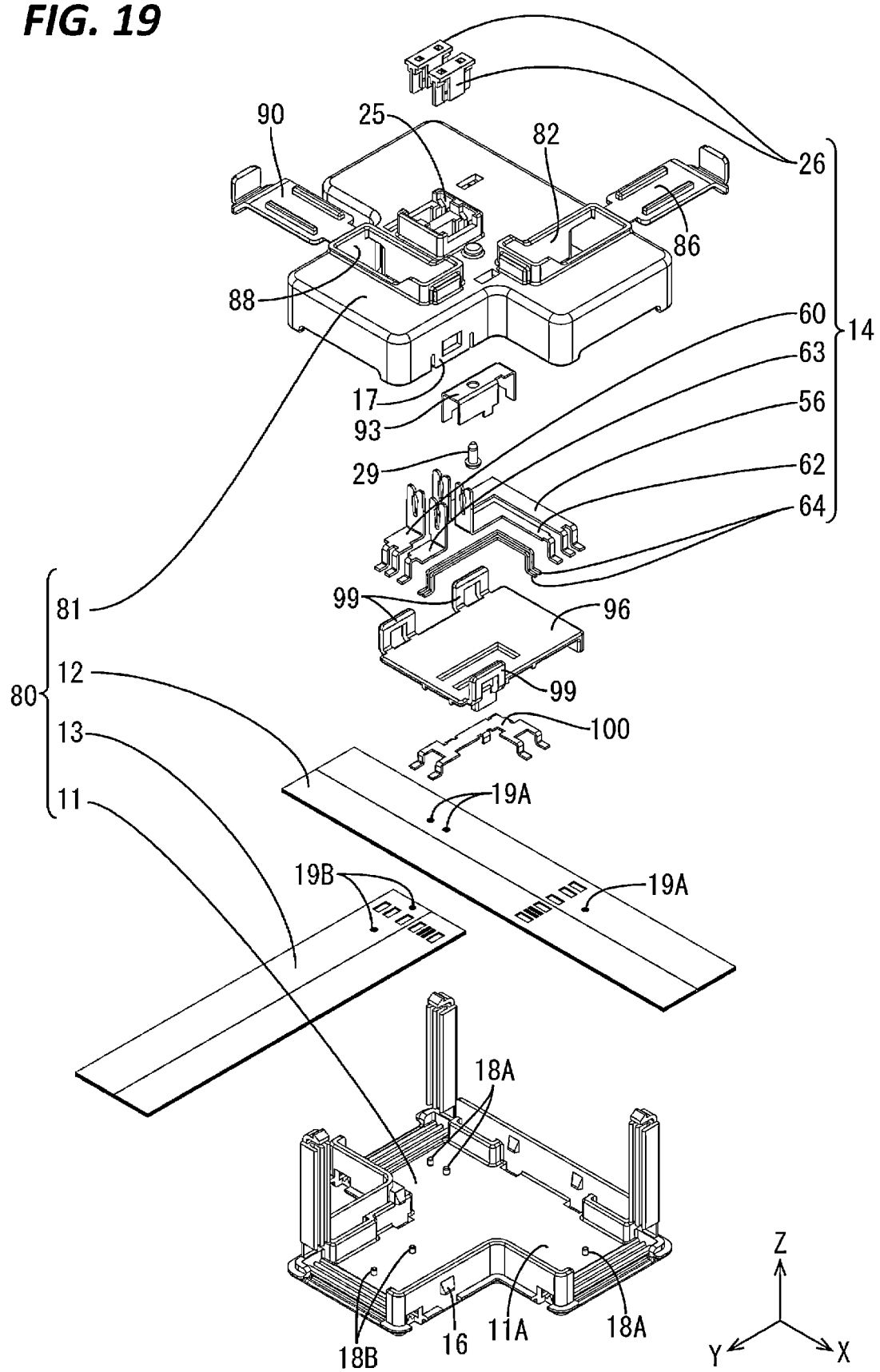
FIG. 19 is a perspective view showing the branch box.

As shown in FIG. 19, a trunk operation hole 82 that extends in the front-rear direction passes through a region at a rear portion of the upper wall of a cover 81, the region extending in the right-left direction and being located slightly on the left side of this rear portion. The trunk operation hole 82 has a rectangular shape when viewed from above. A hole edge portion of the trunk operation hole 82 can be regarded as a frame portion 83 that protrudes slightly upward from the upper wall of the cover 81. A front end portion of the frame portion 83 is provided with a subcover locking reception portion 85 that protrudes forward and to which a subcover locking claw 84, which will be described, is locked.

A rear end portion of the trunk operation hole 82 is provided, as a single body with the cover 81, with a subcover 86 that extends rearward via a hinge 87. The trunk subcover 86 is elongated in the front-rear direction, and the size of the trunk subcover 86 is the same as that of the trunk operation hole 82, or is slightly larger than the size of the trunk operation hole 82 to cover the trunk operation hole 82 (see FIG. 18). A rear end portion of the trunk subcover 86 is provided with a subcover locking claw 84 capable of elastic deformation. The trunk subcover 86 rotates around the hinge 87 due to the hinge 87 undergoing deformation, and covers the trunk operation hole 82. At this time, when the subcover locking claw 84 elastically locks to the subcover locking reception portion 85, the trunk operation hole 82 is kept covered by the trunk subcover 86.

As shown in FIG. 19, a branch operation hole 88 that extends in the right-left direction vertically passes through a portion of the upper wall of the cover 81 that protrudes forward, at a front position of the fuse mounting portion 25. The brunch operation hole 88 has a rectangular shape when viewed from above. A hole edge portion of the branch operation hole 88 can be regarded as a frame portion 83 that protrudes slightly upward from the upper wall of the cover 81. A left end portion of the frame portion 83 is provided with a subcover locking reception portion 85 that protrudes forward and to which the subcover locking claw 84 is locked.

A right end portion of the branch operation hole 88 is provided, as a single body with the cover 81, with a branch subcover 90 that extends to the right via the hinge 87. The branch subcover 90 is elongated in the right-left direction, and the size of the branch subcover 90 is the same as that of the branch operation hole 88, or is slightly larger than the size of the branch operation hole 88 to cover the branch operation hole 88 (see FIG. 18). A right end portion of the branch subcover 90 is provided with a subcover locking claw 84 capable of elastic deformation. The branch subcover 90 rotates around the hinge 87 due to the hinge 87 undergoing deformation, and covers the branch operation hole 88. At this time, when the subcover locking claw 84 elastically locks to the subcover locking reception portion 85, the branch operation hole 88 is kept covered by the branch subcover 90.

Figure 22:
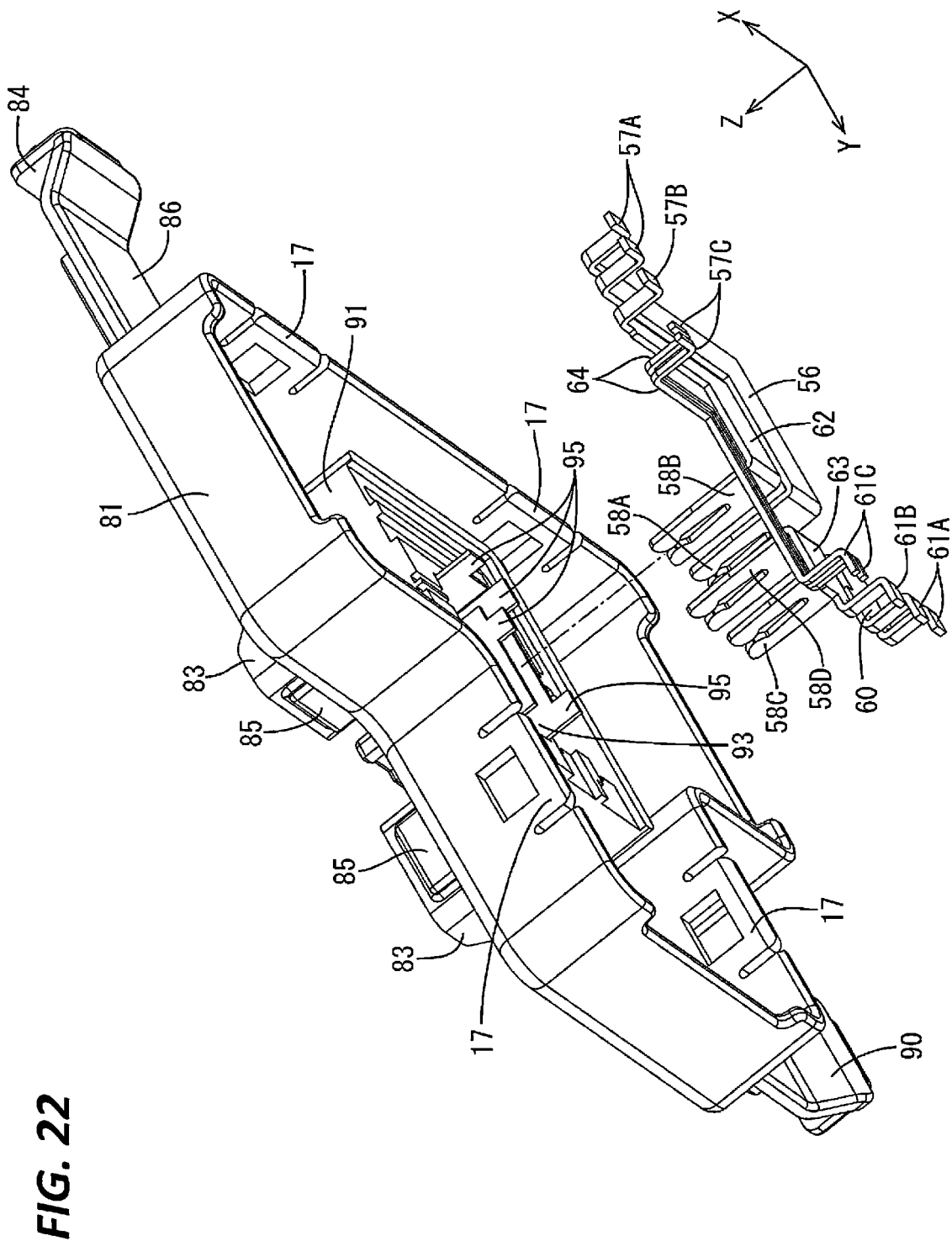
FIG. 22 is a perspective view showing a process for attaching a conductive relay path to the cover.

As shown in FIG. 22, a wiring portion 91 protrudes downward from a lower side of the upper wall of the cover 81 where the first trunk-side bus bar 56, the first branch-side bus bar 60, the second trunk-side bus bar 62, the second branch-side bus bar 63, and the relay bus bars 64 are arranged. The lower side of the wiring portion 91 is provided with multiple lines of ribs 92 that protrude downward. The first trunk-side bus bar 56, the first branch-side bus bar 60, the second trunk-side bus bar 62, the second branch-side bus bar 63, and the relay bus bars 64 are electrically insulated from each other due to these ribs 92 being interposed between them. The wiring portion 91, and the first trunk-side bus bar 56, the first branch-side bus bar 60, the second trunk-side bus bar 62, the second branch-side bus bar 63, and the relay bus bars 64 are fixed to each other, using a known method such as gluing or heat welding.

Figure 21:
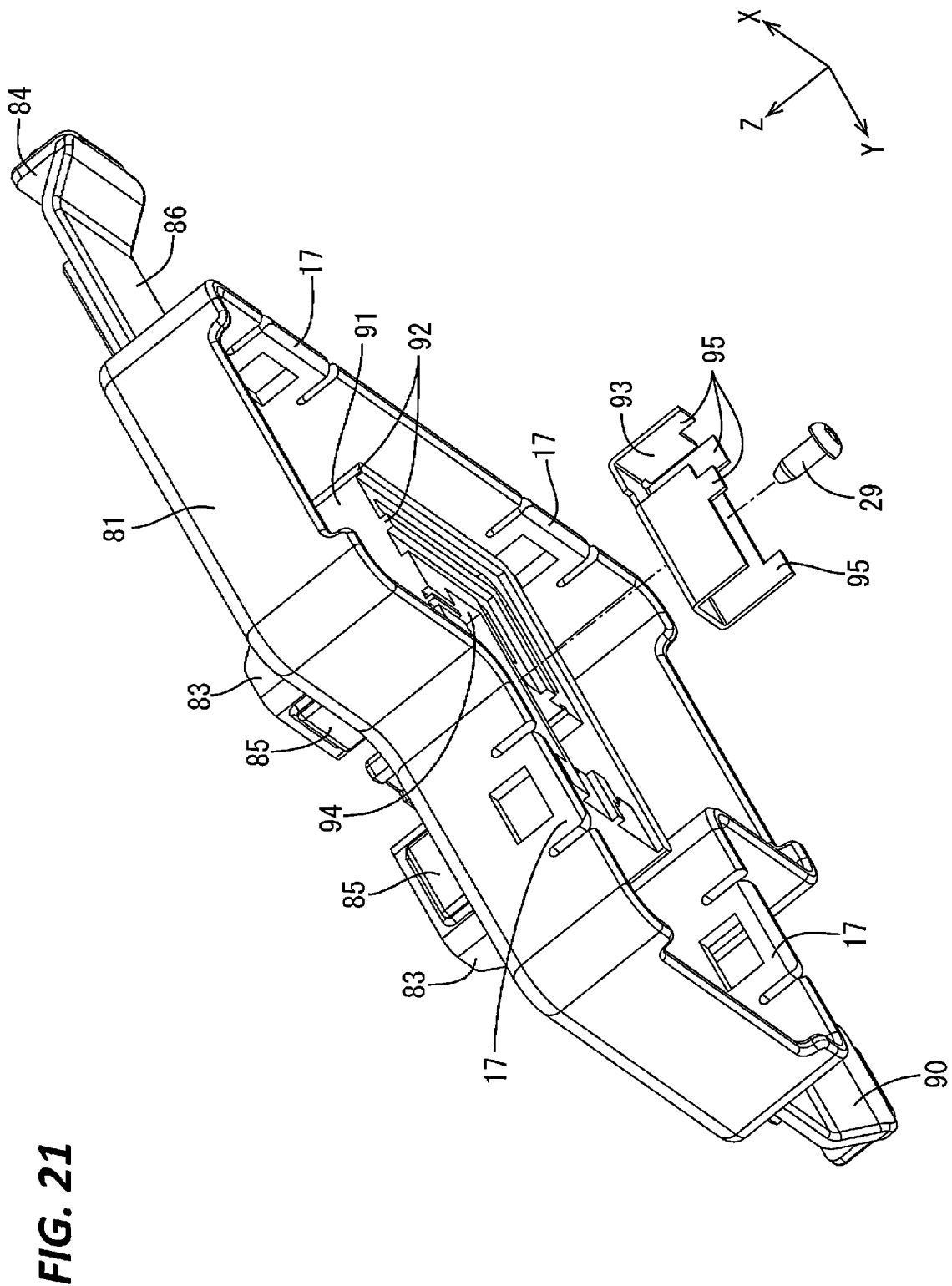
FIG. 21 is a perspective view showing a process for attaching a cover shielding member to the cover.

As shown in FIG. 21, the wiring portion 91 is provided with a mounting recess 94 that is recessed upward and on which the cover shielding member 93 is mounted. The mounting recess 94 is larger than the outer shape of the cover shielding member 93, and is capable of housing the cover shielding member 93. The cover shielding member 93 is screwed to the cover 81 with the screw 29.

Lower end portions of side walls of the cover shielding member 93 are provided with cover-side connection pieces 95 that protrude downward. The cover-side connection pieces 95 have a rectangular shape when viewed from above.

Figure 23:
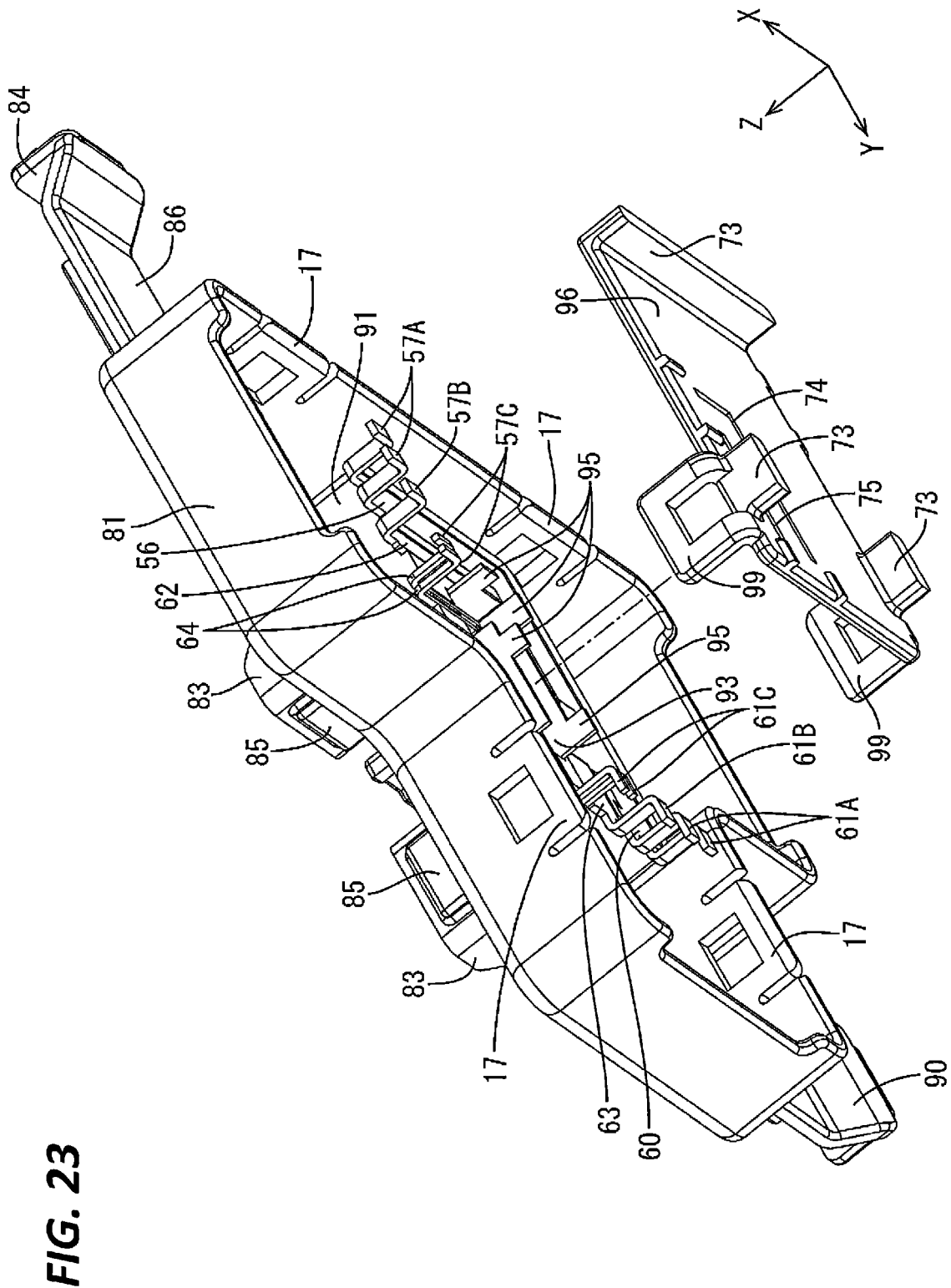
FIG. 23 is a perspective view showing a process for attaching an insulating plate to the cover.

As shown in FIG. 23, the insulating plate 96 made of an insulating synthetic resin is mounted on the wiring portion 91 from below. Side surfaces of the wiring portion 91 are provided with locking portions 97 that protrude outward (see FIG. 20). The upper wall of the cover 81 is provided with die-cutting holes 98 for injection-molding the locking portions 97 at positions corresponding to the locking portions 97. The insulating plate 96 is provided with gate-shaped locking reception portions 99 that protrude upward and are elastically locked to the locking portions 97, at positions corresponding to the locking portions 97. When the locking reception portions 99 are elastically locked to the locking portions 97, the insulating plate 96 is attached to the wiring portion 91. Accordingly, the first trunk-side bus bar 56, the first branch-side bus bar 60, the second trunk-side bus bar 62, the second branch-side bus bar 63, and the relay bus bars 64 are held between the wiring portion 91 and the insulating plate 96.

Base Shielding Member 100

Figure 24:
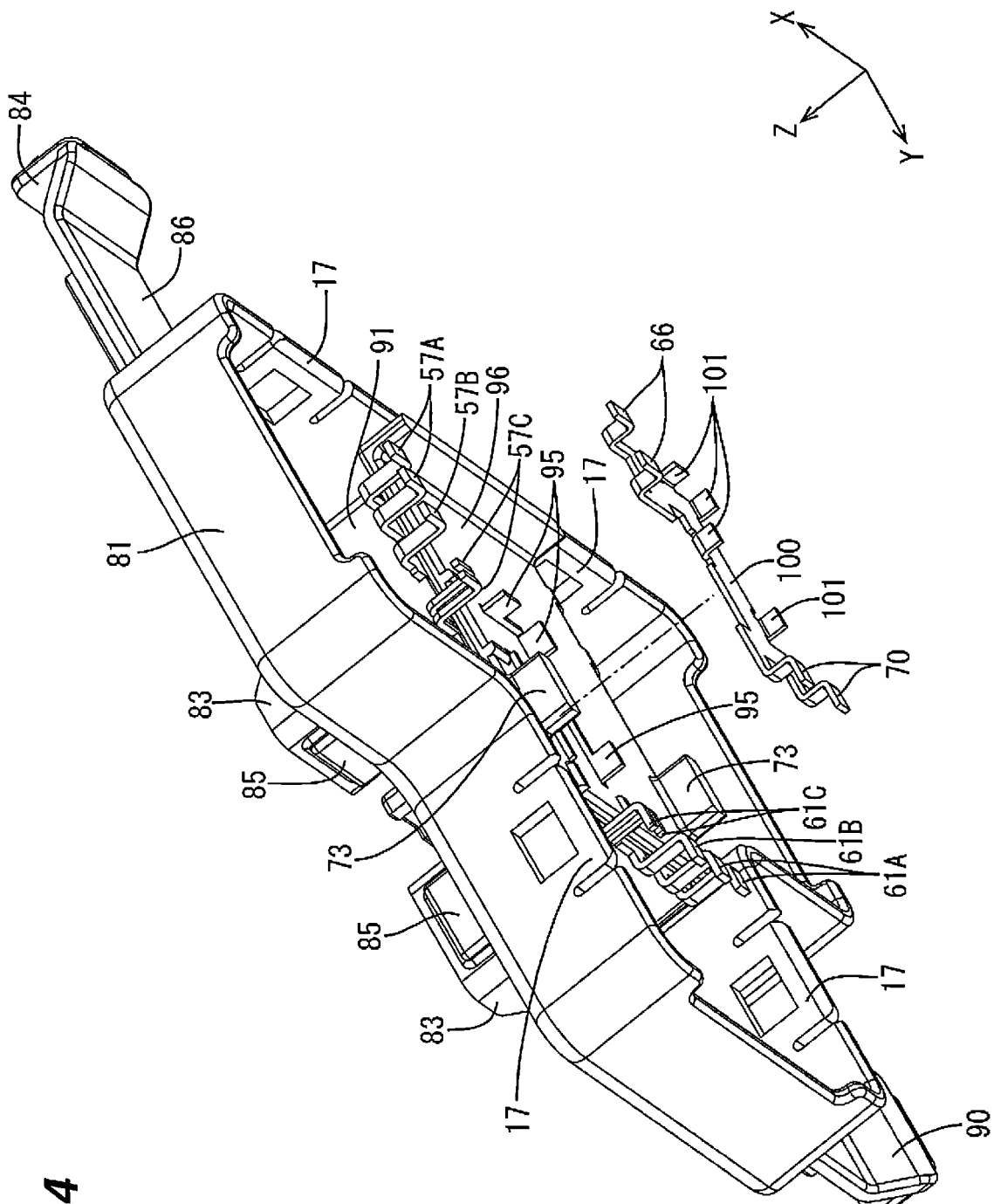
FIG. 24 is a perspective view showing a process for attaching a base shielding member to the cover.

As shown in FIG. 24, a base shielding member 100 is arranged on the lower side of the insulating plate 96. The base shielding member 100 has an L-shape when viewed from above. The relay bus bars 64 and the base shielding member 100 are arranged overlapping each other vertically when viewed from above in a state in which the relay bus bars 64 are attached to the wiring portion 91 of the cover 81, and the base shielding member 100 is attached to the lower side of the insulating plate 96. The outer shape of the base shielding member 100 is slightly larger than a space in which the relay bus bars 64 are arranged. Accordingly, the base shielding member 100 can inhibit noise from entering the relay bus bars 64 from below.

Side edges of the base shielding member 100 are provided with base-side connection pieces 101 that extend downward, at positions corresponding to the cover-side connection pieces 95 formed on the cover shielding members 93. The base-side connection pieces 101 have a rectangular shape when viewed from the side. The size of the base-side connection pieces 101 and the size of the cover-side connection pieces 95 provided on the cover 81 are substantially the same. The cover-side connection pieces 95 and the base-side connection pieces 101 are in contact with each other in a state in which the cover shielding member 93 and the base shielding member 100 are mounted on the cover 81. Accordingly, the cover shielding member 93 and the base shielding member 100 are electrically connected to each other.

Trunk Operation Hole 82 and Branch Operation Hole 89

Figure 20:
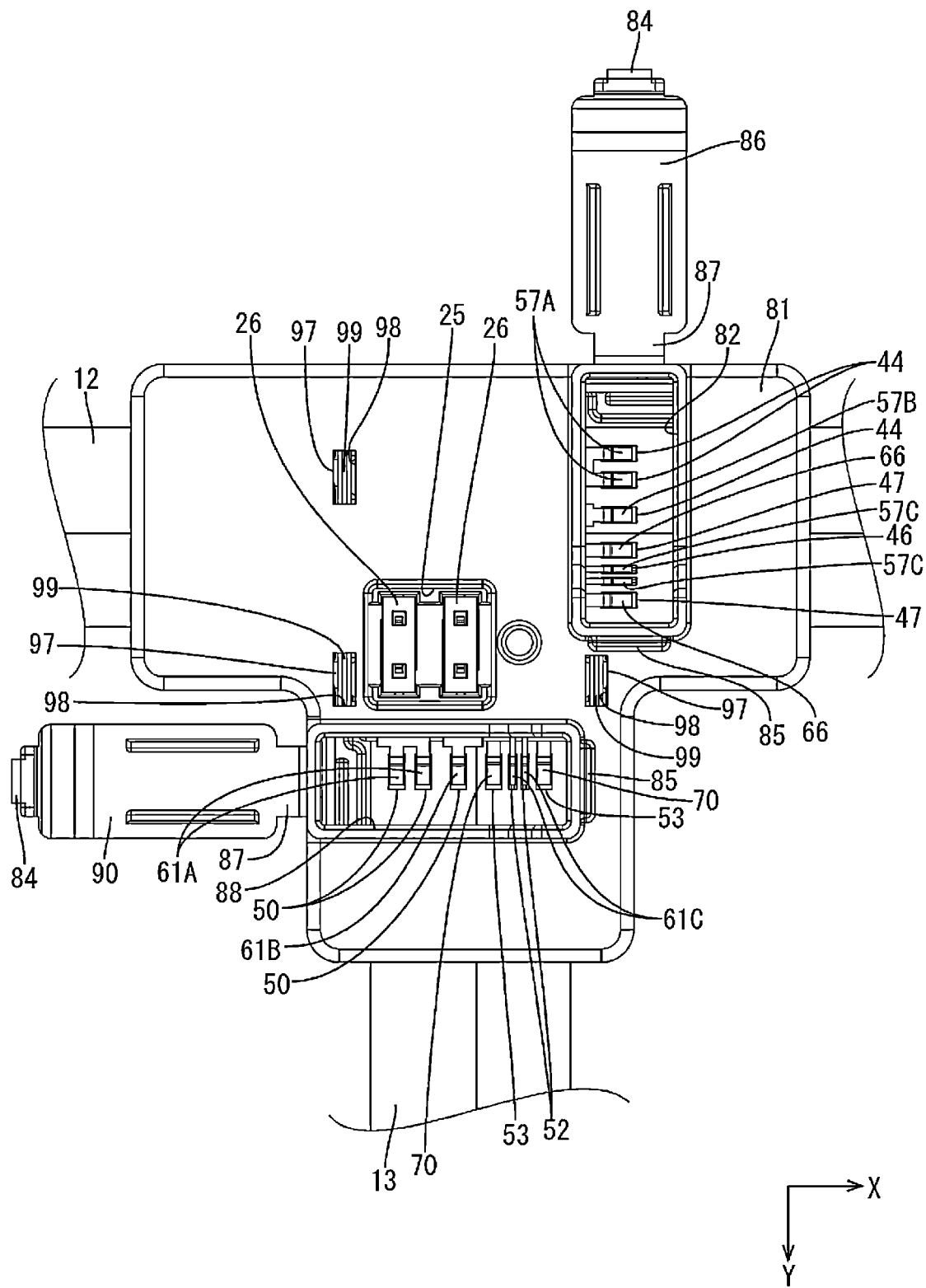
FIG. 20 is a plan view showing the branch box in a state in which a trunk subcover and a branch subcover are opened.

As shown in FIG. 20, when the cover 15 in which the trunk subcover 86 and the branch subcover 90 are opened is attached to the case 11 to which the trunk cable 12 and the branch cable 13 are fixed at predetermined positions, the power trunk opening portions 44, the power trunk lands 45, the trunk-side terminal portions 57A of the first trunk-side bus bar 56, the trunk-side terminal portion 57B of the second trunk-side bus bar 62, the signal trunk opening portions 46, the signal trunk lands 48, the trunk-side terminal portions 57C of the relay bus bars 64, the ground trunk opening portions 47, the ground trunk lands 49, and the trunk-side ground terminal portions 66 of the base shielding member 100 are exposed from the trunk operation holes 82. Accordingly, by inserting a jig (not shown) such as a soldering iron, for example, into the cover 81 through the trunk operation hole 82, it is possible to connect the power trunk lands 45 and the trunk-side terminal portions 57A and 57B of the first trunk-side bus bar 56 and the second trunk-side bus bar 62, connect the signal trunk lands 48 and the trunk-side terminal portions 57C of the relay bus bars 64, and connect the ground trunk lands 49 and the trunk-side ground terminal portions 66 of the base shielding member 100.

Also, the power branch opening portions 50, the power branch lands 51, the branch-side terminal portions 61A of the first branch-side bus bar 60, the branch-side terminal portion 61B of the second branch-side bus bar 63, the signal branch opening portions 52, the signal branch lands 54, the branch-side terminal portions 61C of the relay bus bars 64, the ground branch opening portions 53, the ground branch lands 55, and the branch-side ground terminal portions 70 of the base shielding member 100 are exposed from the branch operation hole 88. Accordingly, by inserting a jig such as a soldering iron, for example, into the cover 81 through the branch operation hole 88, it is possible to connect the power branch lands 51 and the branch-side terminal portions 61A and 61B of the first branch-side bus bar 60 and the second branch-side bus bar 63, connect the signal branch lands 54 and the branch-side terminal portions 61C of the relay bus bars 64, and connect the ground branch lands 55 and the branch-side ground terminal portions 70 of the base shielding member 100.

Because configurations other than the above are substantially the same as that of Embodiment 1, the same members are given the same reference numerals, and their redundant description will be omitted.

Example of Manufacturing Process in this Embodiment

Next, an example of a process for manufacturing a branch box 80 according to this embodiment will be described below. Note that the process for manufacturing the branch box 80 is not limited to the following description. Steps that are the same as those in the process for manufacturing the branch box 80 according to Embodiment 1 will not be described.

The trunk cable 12 is placed on and fixed to a predetermined position of the case 11. The branch cable 13 is placed on and fixed to a predetermined position of the case 11. Solder paste is applied, using a known method such as screen printing, onto the upper surfaces of the power trunk lands 45, the signal trunk lands 48, the ground trunk lands 49, the power branch lands 51, the signal branch lands 54, and the ground branch lands 55.

As shown in FIG. 21, the cover shielding member 93 is mounted, from below, on the mounting recess 94 in the wiring portion 91 formed on the lower side of the upper wall of the cover 81, and the cover shielding member 93 is screwed to the cover 81 with the screw 29.

As shown in FIG. 22, the first trunk-side bus bar 56, the first branch-side bus bar 60, the second trunk-side bus bar 62, the second branch-side bus bar 63, and the relay bus bars 64 are mounted on the wiring portion 91 from below, and these bus bars are fixed to the wiring portion 91 using a known method such as gluing or heat welding.

As shown in FIG. 23, the insulating plate 96 is mounted on the wiring portion 91 from below. When the locking reception portions 99 of the insulating plate 96 are elastically locked to the locking portions 97 of the wiring portion 91, the first trunk-side bus bar 56, the first branch-side bus bar 60, the second trunk-side bus bar 62, the second branch-side bus bar 63, and the relay bus bars 64 are held by the wiring portion 91 and the insulating plate 96.

As shown in FIG. 24, the base shielding member 100 is mounted on the insulating plate 96 from below, and is fixed thereto using a known method such as gluing or heat welding. At this time, when the cover-side connection pieces 95 of the cover shielding member 93 and the base-side connection pieces 101 of the base shielding member 100 come into contact with each other, the cover shielding member 93 and the base shielding member 100 are electrically connected to each other.

The two fuses 26 are mounted on the fuse mounting portion 25 provided on the cover 81 from above. When the leads of the fuses 26 are held by fuse connection terminal portions 58A, 58B, 58C, and 58D, one of the fuses 26 is electrically connected to the first trunk-side bus bar 56 and the first branch-side bus bar 60, and the other fuse 26 is electrically connected to the second trunk-side bus bar 62 and the second branch-side bus bar 63.

Figure 25:
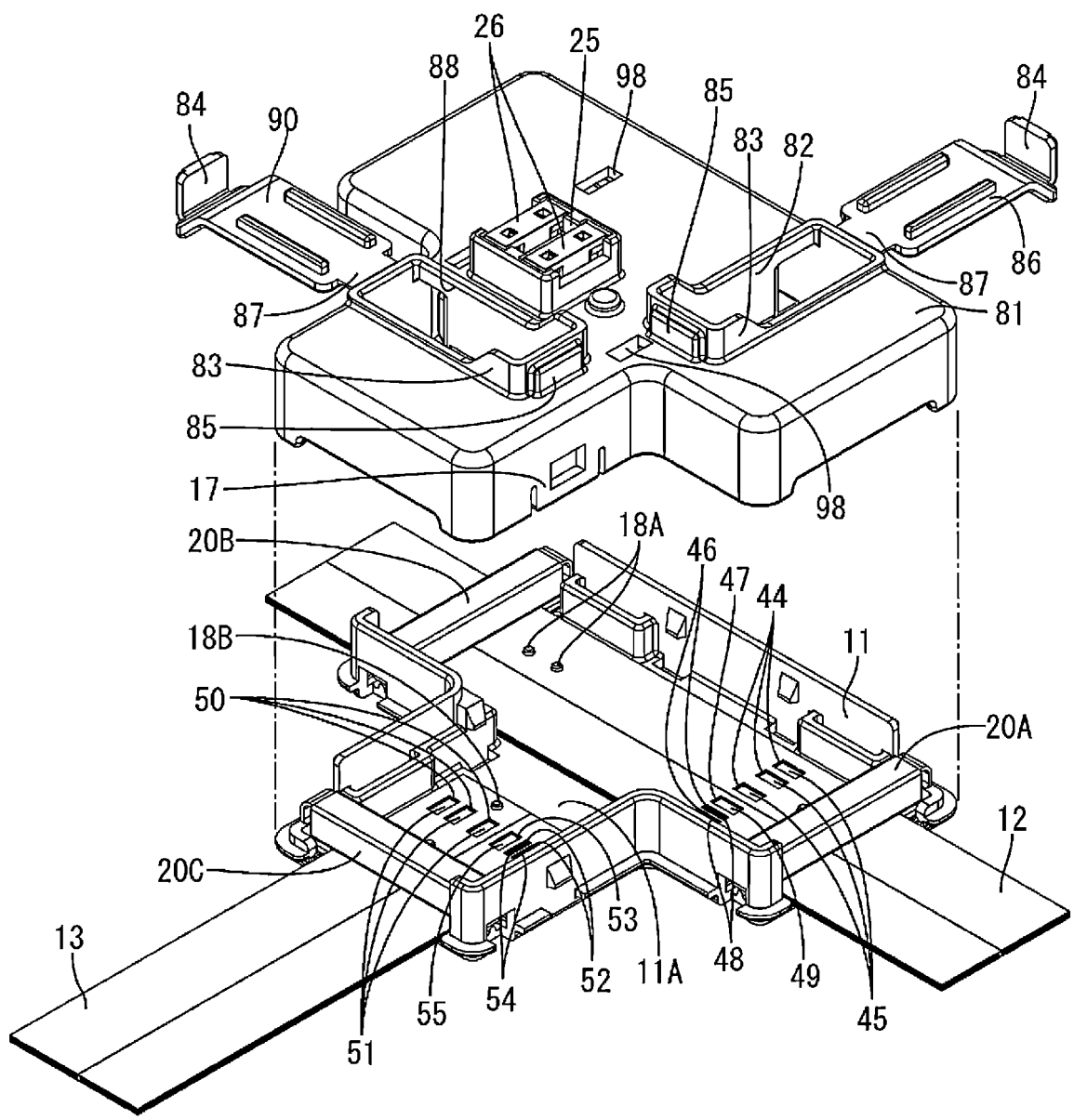
FIG. 25 is a perspective view showing a process for assembling the cover and the case on which the trunk cable and the branch cable are mounted.

As shown in FIG. 25, the cover 81 is mounted on the case 11 from above. The case 11 and the cover 81 are assembled into a single body through elastic engagement between the locking portions 16 provided on the side walls of the case 11 and the locking reception portions 17 provided on the side walls of the cover 81.

A jig (not shown) such as a soldering iron, for example, is inserted into the cover 81 through the trunk operation hole 82, and then, the operation for connecting the power trunk lands 45 to the trunk-side terminal portions 57A and 57B of the first trunk-side bus bar 56 and the second trunk-side bus bar 62, the operation for connecting the signal trunk lands 48 to the trunk-side terminal portions 57C of the relay bus bars 64, and the operation for connecting the ground trunk lands 49 to the trunk-side ground terminal portions 66 of the base shielding member 100 are performed (see FIG. 20).

A jig such as a soldering iron, for example, is inserted into the cover 81 through the branch operation hole 88, and then, the operation for connecting the power branch lands 51 to the branch-side terminal portions 61A and 61B of the first branch-side bus bar and the second branch-side bus bar 63, the operation for connecting the signal branch lands 54 to the branch-side terminal portions 61C of the relay bus bars 64, and the operation for connecting the ground branch lands 55 to the branch-side ground terminal portions 70 of the base shielding member 100 are performed (see FIG. 20).

The trunk operation hole 82 is covered by the trunk subcover 86 by rotating the trunk subcover 86 around the hinge 21 to elastically lock the subcover locking claws 84 to the subcover locking reception portions 85. The branch operation hole 88 is covered by the branch subcover 90 in a similar manner. Accordingly, the branch box 80 according to this embodiment is complete (see FIG. 18).

Effects of this Embodiment

Next, effects of this embodiment will be described below. According to this embodiment, the cover 81 includes the trunk operation hole 82, which is open at a position corresponding to the trunk lands and face the power trunk lands 45 and the signal trunk lands 48, and the branch operation hole 88, which is open at a position corresponding to the branch lands and faces the power branch lands 51 and the signal branch lands 54, and the trunk subcover 86 for covering the trunk operation hole 82 and the branch subcover 90 for covering the branch operation hole 88 can be attached to the cover 81.

According to the above-described configuration, by inserting a jig through the trunk operation hole 82 in a state in which the cover 81 is mounted on the case 11, it is possible to connect the power trunk lands 45 and the trunk-side terminal portions 57A and 57B of the first trunk-side bus bar 56 and the second trunk-side bus bar 62, and to connect the signal trunk lands 48 and the trunk-side terminal portions 57C of the relay bus bars 64. Also, it is possible to connect the power branch lands 51 and the branch-side terminal portions 61A and 61B of the first branch-side bus bar 60 and the second branch-side bus bar 63, and connect the signal branch lands 54 and the branch-side terminal portions 61C of the relay bus bars 64. Then, it is possible to inhibit foreign matter such as dust from entering the case 11 by covering the trunk operation hole 82 with the trunk subcover 86 and covering the branch operation hole 88 with the branch subcover 90. Accordingly, it is possible to improve workability when the branch box 80 is manufactured.

According to this embodiment, the base shielding member 100 and the cover shielding member 93 are electrically connected to each other.

According to the above-described configuration, it is possible to electrically connect the ground trunk conductors 32, the ground branch conductors 39, the base shielding member 100, and the cover shielding member 93, and thus to reliably shield the relay bus bars 64.

Embodiment 3

Next, Embodiment 3 of technology disclosed in this specification will be described with reference to FIGS. 26 to 29.

Figure 27:
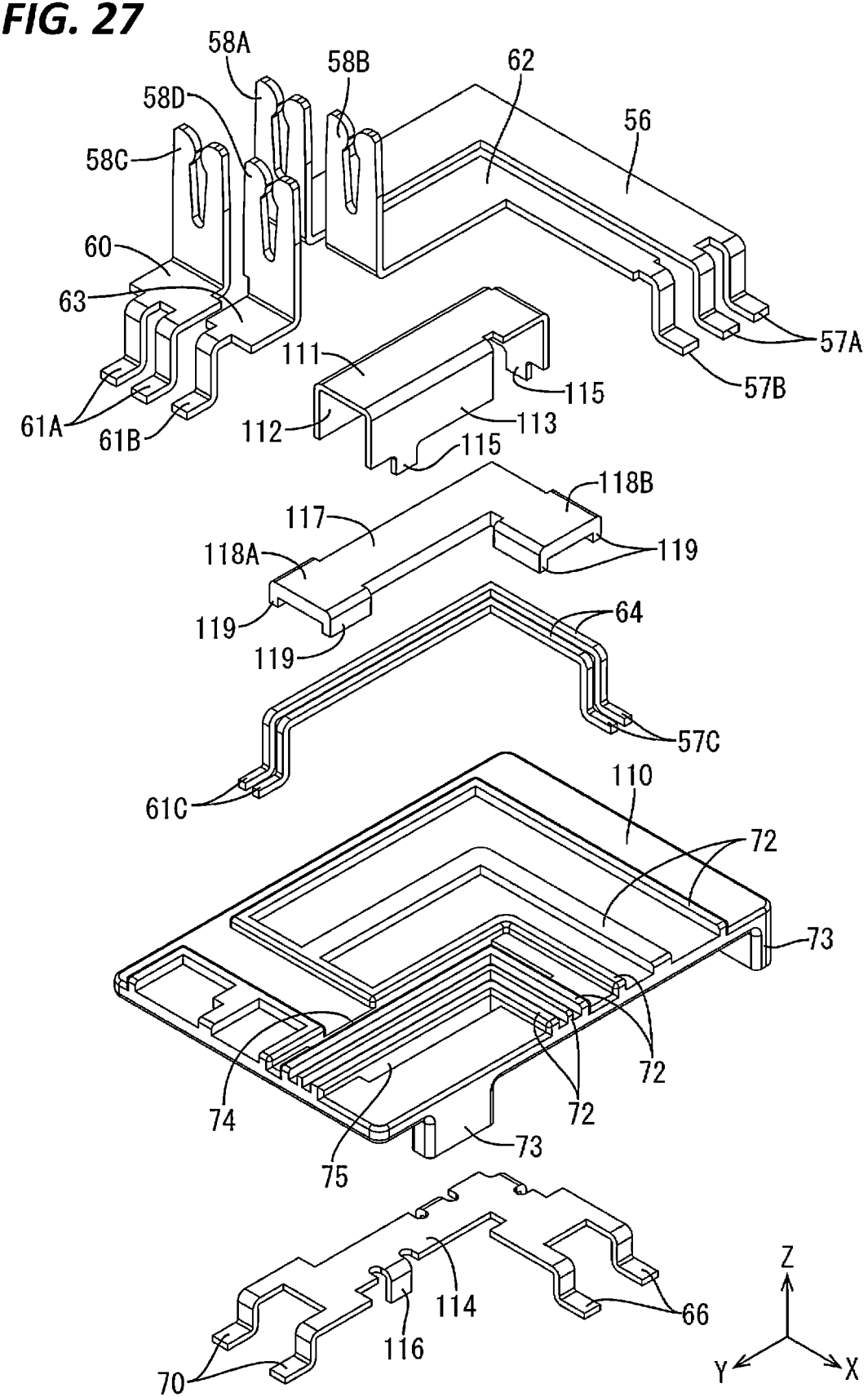
FIG. 27 is an exploded perspective view showing the conductive relay path, the cover shielding member, the insulating cover, an insulating plate, and the base shielding member.

As shown in FIG. 27, an insulating plate 110 is made of an insulating synthetic resin, and has a substantially rectangular shape when viewed from above. The insulating plate 110 includes an insulating plate-side first slit 74 that is bent in an L-shape when viewed from above, and an insulating plate-side second slit 75 that is located on the left side of the insulating plate-side first slit 74 and extends in the front-rear direction when viewed from above.

A first trunk-side bus bar 56, a first branch-side bus bar 60, a second trunk-side bus bar 62, a second branch-side bus bar 63, and relay bus bars 64 are arranged on the upper side of the insulating plate 110. The upper side of the insulating plate 110 is provided with multiple lines of ribs 72 that protrude upward. The first trunk-side bus bar 56, the first branch-side bus bar 60, the second trunk-side bus bar 62, the second branch-side bus bar 63, and the relay bus bars 64 are electrically insulated from each other due to these ribs 72 being interposed between them.

Figure 26:
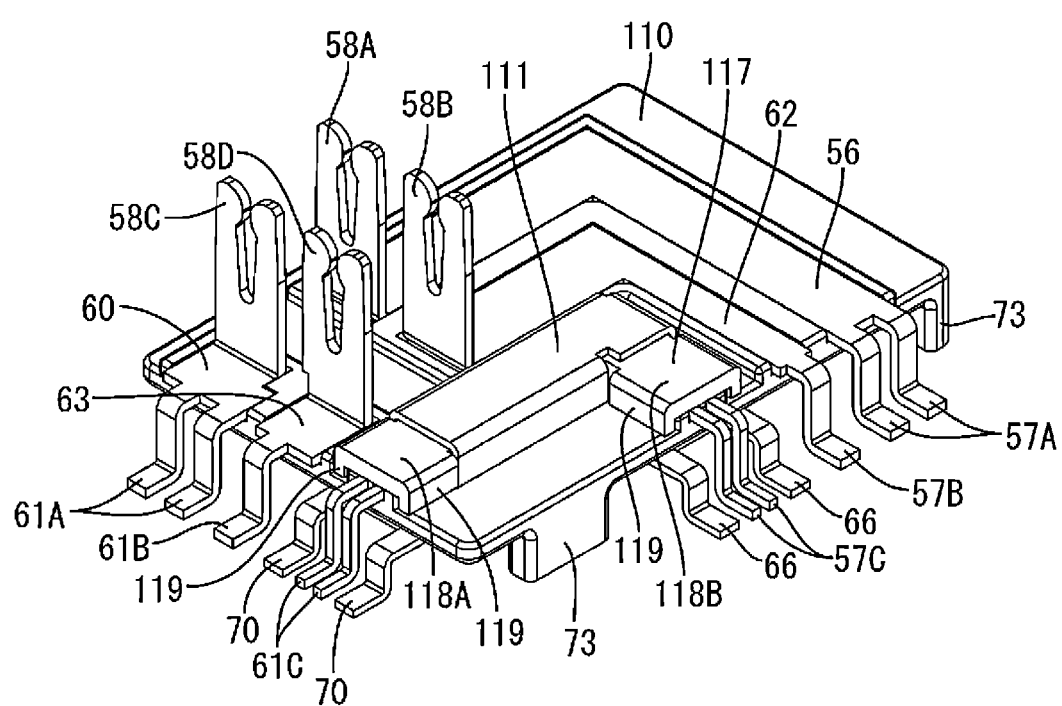
FIG. 26 is a perspective view showing conductive relay path, a cover shielding member, an insulating cover, and a base shielding member according to Embodiment 3.

As shown in FIG. 26, a cover shielding member 111 is arranged on the upper side of the insulating plate 110. The cover shielding member 111 includes an upper wall, and a first side wall 112 and a second side wall 113 that extend downward from side edges of the upper wall. The first side wall 112 is bent in an L-shape when viewed from above. The first side wall 112 has a shape corresponding to the above-described insulating plate-side first slit 74, and a lower end portion of the first side wall 112 is inserted into the insulating plate-side first slit 74 from above.

The second side wall 113 extends in the front-rear direction when viewed from above. The second side wall 113 has a shape corresponding to the above-described insulating plate-side second slit 75, and a lower end portion of the second side wall 113 is inserted into the insulating plate-side second slit 75 from above.

As shown in FIG. 27, the lower edges of the first side wall 112 and the second side wall 113 of the cover shielding member 111 are provided with cover connection pieces 115 that protrude downward. The cover-side connection pieces 115 have a substantially rectangular shape when viewed from the side.

The lower side of the insulating plate 110 is provided with a plurality of legs 73 that protrude downward. Due to these legs 73, the insulating plate 110 is spaced apart from a bottom wall 11A of the case 11 in a state in which the insulating plate 110 is placed on the bottom wall 11A.

A base shielding member 114 is arranged on the lower side of the insulating plate 110. The base shielding member 114 has an L-shape when viewed from above. The relay bus bars 64 and the base shielding member 114 are arranged overlapping each other vertically when viewed from above in a state in which the relay bus bars 64 are attached to the wiring portion 91 of the cover 81, and the base shielding member 114 is attached to the lower side of the insulating plate 110. The outer shape of the base shielding member 114 is slightly larger than a space in which the relay bus bars 64 are arranged. Accordingly, the base shielding member 114 can inhibit noise from entering the relay bus bars 64 from below.

Side edges of the base shielding member 114 are provided with base-side connection pieces 116 that extend downward, at positions corresponding to the cover-side connection pieces 115 formed on the cover shielding members 111. The base-side connection pieces 116 have a rectangular shape when viewed from the side. The size of the base-side connection pieces 116 and the size of the cover-side connection pieces 115 provided on the cover 81 are substantially the same.

Figure 28:
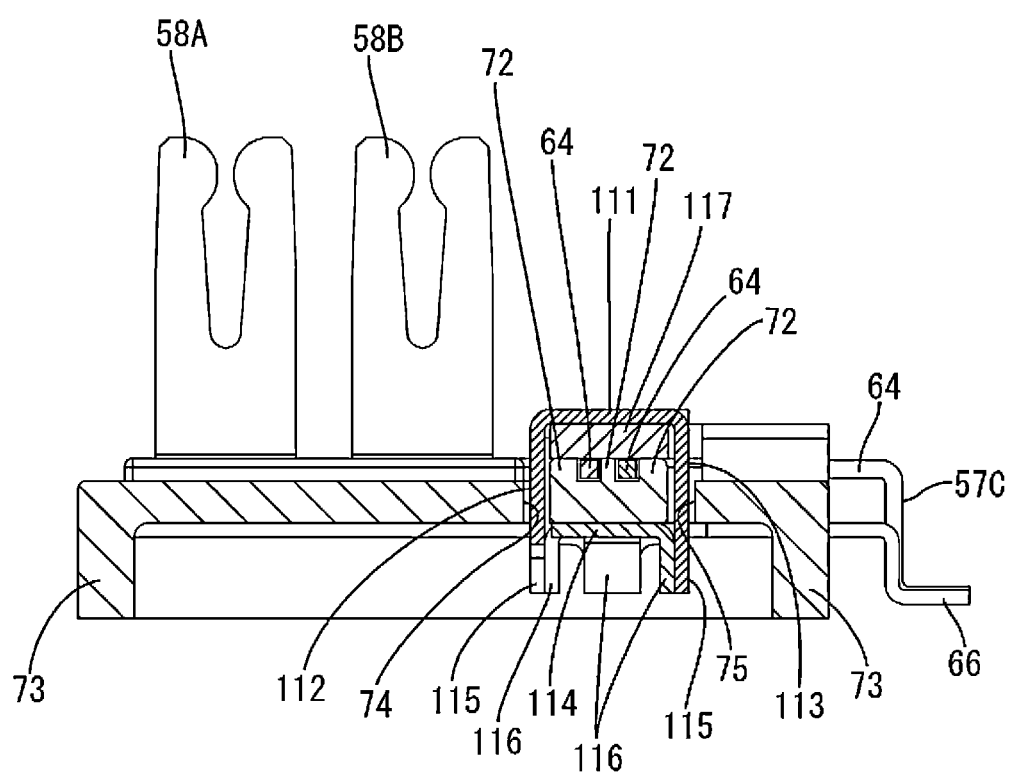
FIG. 28 is a cross-sectional view taken along a plane that is parallel to the plane X-Z and passes through legs in FIG. 26.
Figure 29:
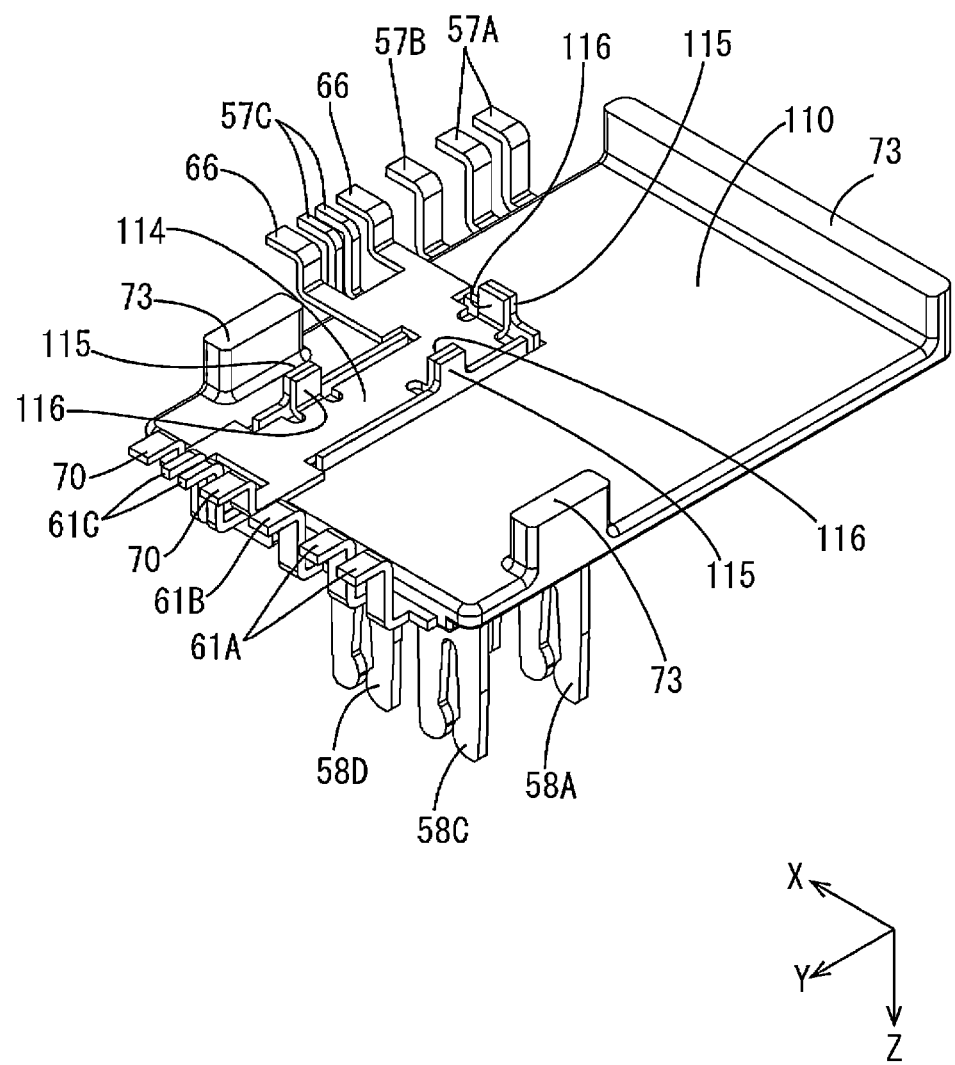
FIG. 29 is a perspective view showing a conductive relay path, a cover shielding member, an insulating cover, and a base shielding member that are attached to the insulating plate.

As shown in FIGS. 28 and 29, the cover-side connection pieces 115 and the base-side connection pieces 116 are in contact with each other in a state in which the cover shielding member 111 and the base shielding member 114 are mounted on the cover 81. Accordingly, the cover shielding member 111 and the base shielding member 114 are electrically connected to each other.

The insulating plate 110, the first trunk-side bus bar 56, the first branch-side bus bar 60, the second trunk-side bus bar 62, the second branch-side bus bar 63, and the relay bus bars 64, and the base shielding member 114 are fixed to each other, using a known method such as gluing or heat welding.

As shown in FIG. 28, an insulating cover 117 made of an insulating synthetic resin is arranged between the relay bus bars 64 and the cover shielding member 111. The insulating cover 117 has an L-shape when viewed from above (see FIG. 27).

As shown in FIG. 26, a front end portion of the insulating cover 117 can be regarded as a protruding portion 118A that protrudes forward from a front end portion of the cover shielding member 111. Also, a left end portion of the insulating cover 117 can be regarded as a protruding portion 118B that protrudes to the left from a left end portion of the cover shielding member 111. The width of the protruding portions 118A and 118B is larger than that of the other portions of the insulating portion. Legs 119 extend downward from side edges of the protruding portions 118A and 118B. Because these legs 119 are in contact with the insulating plate 110 from above, a space in which the relay bus bars 64 can be arranged is formed between the insulating cover 117 and the insulating plate 110.

Because configurations other than the above are substantially the same as that of Embodiment 1, the same members are given the same reference numerals, and their redundant description will be omitted.

According to this embodiment, the insulating cover 117 made of an insulating synthetic resin is interposed between the relay bus bars 64 and the cover shielding member 111.

According to the above-described configuration, it is possible to inhibit short circuits between the relay bus bars 64 and the cover shielding member 111.

Embodiment 4

Next, Embodiment 4 of technology disclosed in this specification will be described with reference to FIG. 30.

Figure 30:
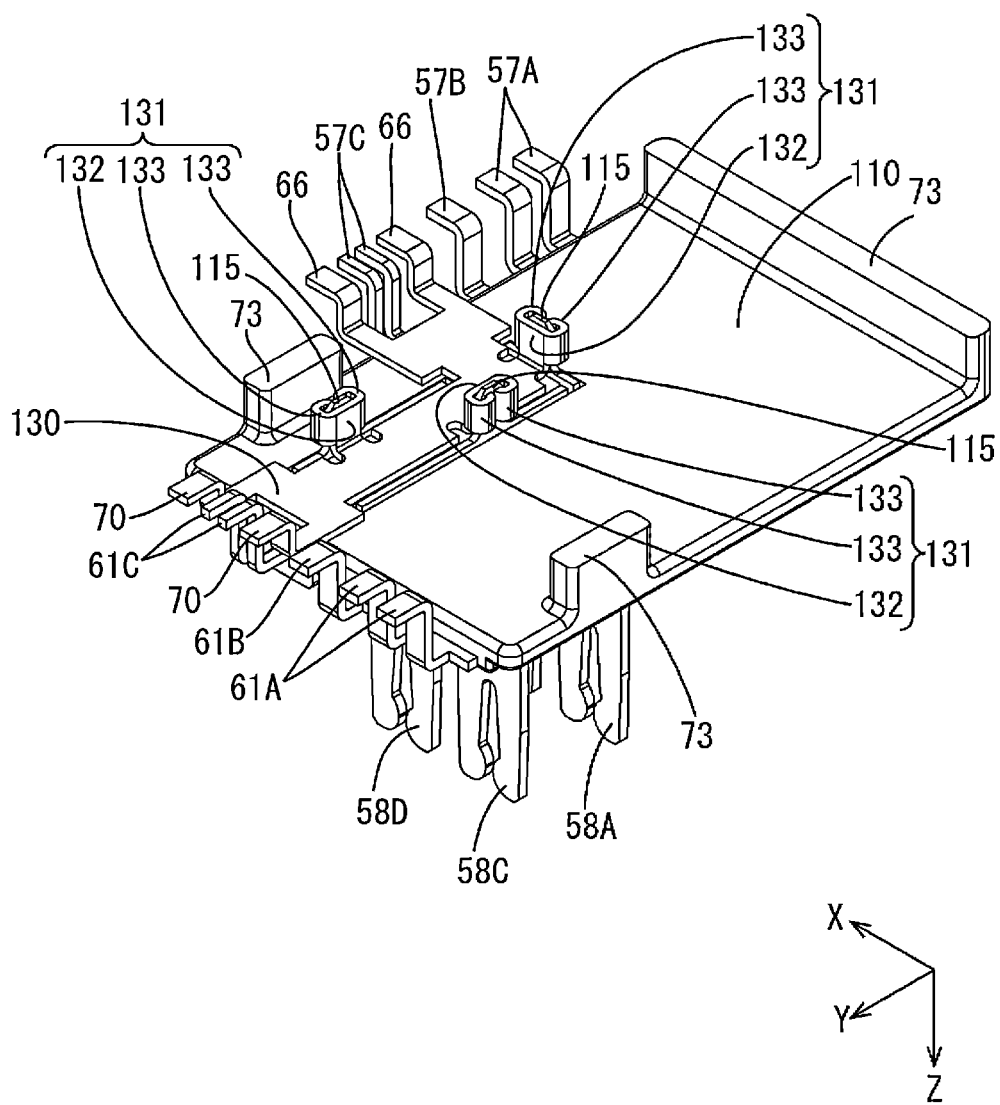
FIG. 30 is a perspective view showing a conductive relay path, a cover shielding member, an insulating cover, an insulating plate, and a base shielding member according to Embodiment 4.

As shown in FIG. 30, in a base shielding member 130 according to this embodiment, a base-side connection piece 131 includes a base portion 132 that protrudes downward, and a pair of elastic contact pieces 133 that extend laterally from both side edges of the base portion 132. The elastic contact pieces 133 are folded back toward the base portion 132. The cover-side connection pieces 115 of the cover shielding member 111 are inserted from above into the space surrounded by the base portion 132 and the pair of folded elastic contact pieces 133.

When outer surfaces of the cover-side connection pieces 115 come into contact with the pair of elastic contact pieces 133, the cover-side connection pieces 115 are pressed against the base portion 132 due to the elastic force of the elastic contact pieces 133. Accordingly, the cover shielding member 111 and the base shielding member 130 are electrically connected to each other.

Because configurations other than the above are substantially the same as that of Embodiment 3, the same members are given the same reference numerals, and their redundant description will be omitted.

According to the above-described configuration, the cover-side connection pieces 115 can reliably come into contact with the base-side connection pieces 131 because the cover-side connection pieces 115 are pressed against the base portion 132 due to the elastic force of the elastic contact pieces 133 provided on the base-side connection pieces 131. Accordingly, it is possible to improve the reliability of electrical connection between the cover shielding member 111 and the base shielding member 130. As a result, it is possible to improve shield performance for the relay bus bars 64.

Embodiment 5

Next, Embodiment 5 of technology disclosed in this specification will be described with reference to FIG. 31.

Figure 31:
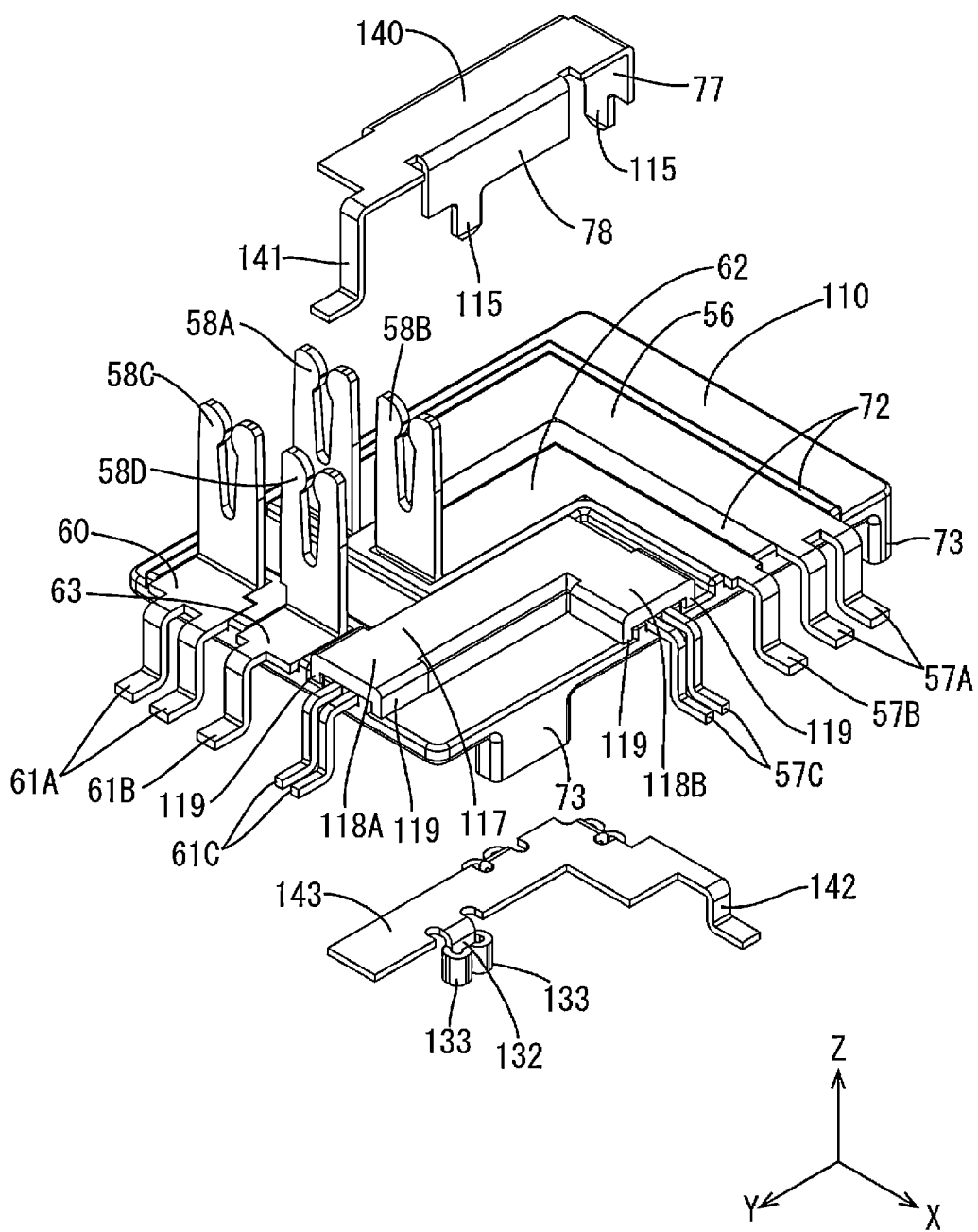
FIG. 31 is an exploded perspective view showing a conductive relay path, a cover shielding member, an insulating cover, an insulating plate, and a base shielding member according to Embodiment 5.

As shown in FIG. 31, the cover shielding member 140 according to this embodiment includes one branch-side ground terminal portion 141 that extends forward from its front end portion and is bent downward in a crank shape. This branch-side ground terminal portion 141 is electrically connected to ground branch lands 55 of the branch cable 13.

Also, a left end portion of a base shielding member 143 includes one trunk-side ground terminal portion 142 that extends to the left and is bent downward in a crank shape. This trunk-side ground terminal portion 142 is electrically connected to ground trunk lands 49 of the trunk cable 12.

Because configurations other than the above are substantially the same as that of Embodiment 4, the same members are given the same reference numerals, and their redundant description will be omitted.

According to this embodiment, the base shielding member 143 is connected to the ground trunk lands 49, and the cover shielding member 140 is connected to the ground branch lands 55. Also, the base-side connection pieces 131 of the base shielding member 143 and the cover-side connection pieces 115 of the cover shielding member 140 are electrically connected to each other due to the elastic force of the elastic contact pieces 133 formed in the connection pieces 131. Accordingly, it is possible to further improve shield performance for the base shielding member 130 and the cover shielding member 140.

Embodiment 6

Next, Embodiment 6 of technology disclosed in this specification will be described with reference to FIGS. 32 and 33.

As shown in FIG. 32, a first trunk-side bus bar 56, a first branch-side bus bar 60, a second trunk-side bus bar 62, a second branch-side bus bar 63, relay bus bars 64, a cover shielding member 150, and a base shielding member 151 according to this embodiment are formed as a single body through insert molding with an insulating synthetic resin. The molded synthetic resin can be regarded as an insulating portion 152. The insulating portion 152 has a substantially parallelepiped shape that is flat in the up-down direction. The lower side of the insulating portion 152 is provided with legs 153 that protrude downward.

Figure 33:
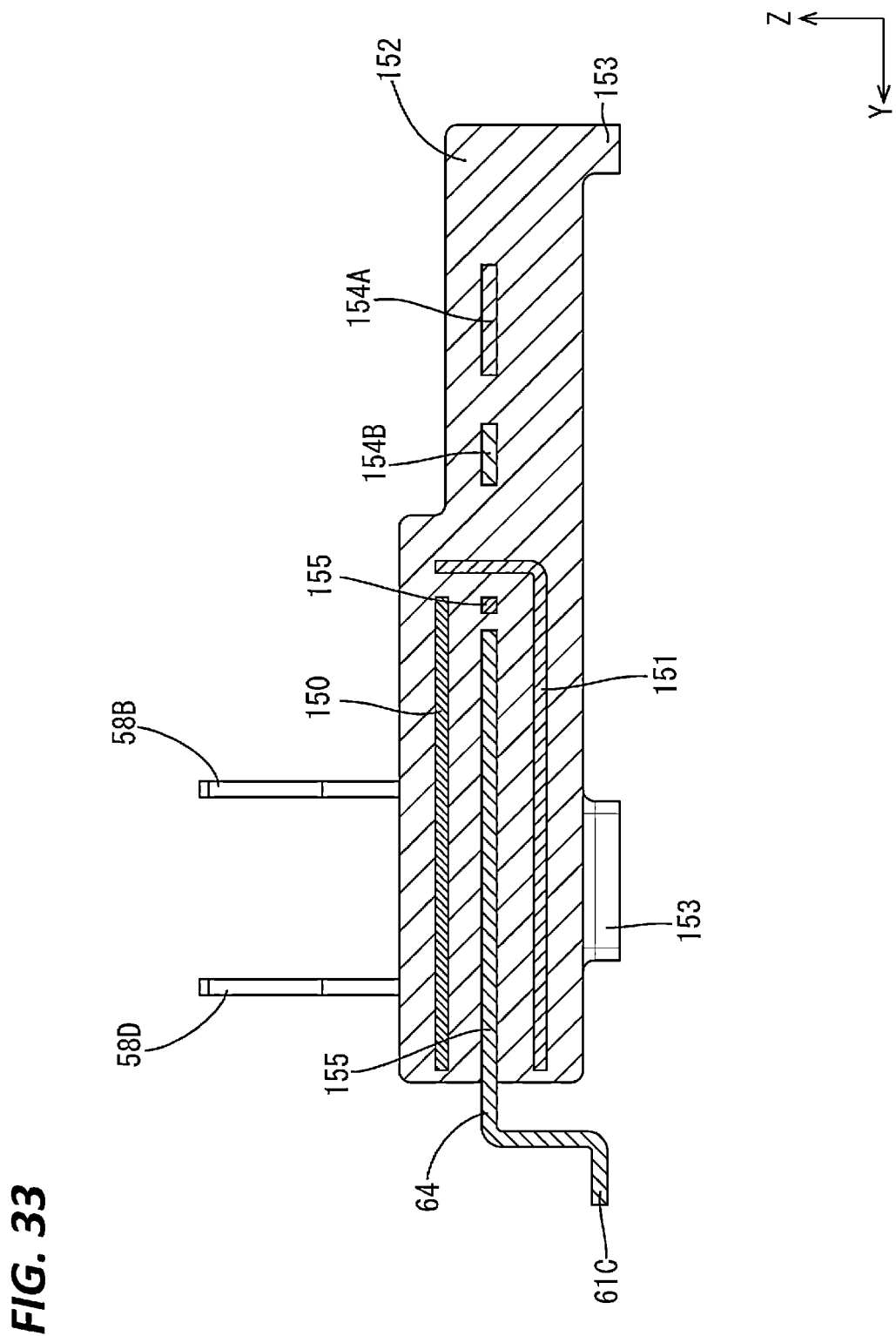
FIG. 33 is a cross-sectional view taken along a plane that is parallel to the plane Y-Z and passes through a relay bus bar in FIG. 32.

As shown in FIG. 33, portions of the first trunk-side bus bar 56 and the second trunk-side bus bar 62 that are different from trunk-side terminal portions 57A and 57B and fuse connection terminal portions 58A and 58B can be regarded as a first trunk-side embedded portion 154A and a second trunk-side embedded portion 154B that are embedded in the insulating portion 152. Also, portions of the first branch-side bus bar 60 and the second branch-side bus bar 63 that are different from branch-side terminal portions 61A and 61B and fuse connection terminal portions 58C and 58D can be regarded as a first branch-side embedded portion (not shown) and a second branch-side embedded portion (not shown) that are embedded in the insulating portion 152.

Portions of the relay bus bars 64 that are different from trunk-side terminal portions 57C and branch-side terminal portions 61C can be regarded as embedded portions 155 embedded in the insulating portion 152.

The base shielding member 151 is arranged below the relay bus bars 64 with a synthetic resin interposed between them. A front end portion of the base shielding member 151 is provided with a branch-side ground terminal portion 70 that is bent downward in a crank shape. A rear end portion of the base shielding member 151 extends slightly rearward from positions at which the relay bus bars 64 are arranged, and is bent upward at a right angle in the synthetic resin material. The portion of the rear end portion of the base shielding member 151 that is bent upward is arranged at a position that is slightly spaced apart from the cover shielding member 150 in the front-rear direction. A portion of the base shielding member 151 that is different from the branch-side ground terminal portions 70 is embedded in the insulating portion 152.

The cover shielding member 150 is arranged above the relay bus bars 64 with a synthetic resin interposed between them. A left end portion of the cover shielding member 150 can be regarded as a trunk-side ground terminal portion 66 that is bent downward in a crank shape. A portion of the cover shielding member 150 that is different from the trunk-side ground terminal portions 66 is embedded in the synthetic resin.

Because configurations other than the above are substantially the same as that of Embodiment 1, the same members are given the same reference numerals, and their redundant description will be omitted.

According to this embodiment, portions of the first trunk-side bus bar 56 and the second trunk-side bus bar 62 that are different from the trunk-side terminal portions 57 and the fuse connection terminal portions 58A and 58B can be regarded as the first trunk-side embedded portion 154A and the second trunk-side embedded portion 154B that are embedded in the insulating portion 152 made of the synthetic resin. Also, portions of the first branch-side bus bar 60 and the second branch-side bus bar 63 that are different from the branch-side terminal portions 61A and 61B and the fuse connection terminal portions 58C and 58D can be regarded as a first branch-side embedded portion and a second branch-side embedded portion that are embedded in the insulating portion 152. Also, portions of the relay bus bars 64 that are different from the trunk-side terminal portions 57C and the branch-side terminal portions 61C can be regarded as the embedded portions 155 embedded in the insulating portion.

According to the above-described configuration, it is possible to reliably and electrically insulate the first trunk-side bus bar 56, the second trunk-side bus bar 62, the first branch-side bus bar 60, the second branch-side bus bar 63, and the relay bus bars 64 due to the insulating synthetic resin.

Other Embodiments

The technology disclosed in this specification is not limited to the embodiments described above with use of the foregoing description and drawings, and embodiments such as the following are also encompassed in the technical scope of the technology disclosed in this specification.

(1) A plurality of trunk cables 12 may be arranged in the case 11, or a plurality of branch cables 13 may also be arranged in the case 11.

(2) A signal line may also be provided with a fuse.

(3) A power line may be electromagnetically shielded as a result of the power line being enclosed by a shielding member.

(4) The case 11 and the cover 15 may also be formed as a single body by a hinge.

(5) The cover 15 may also be a component separate from the trunk subcover 86 and the branch subcover 90. Also, a configuration may be adopted in which the cover 15 is a component separate from the trunk subcover 86 and the branch subcover 90, and the trunk subcover 86 and the branch subcover 90 are rotatably held by the cover 15 due to a shaft portion being provided on one of them, and a bearing portion being provided on the other.

(6) The left holding portion 20A, the right holding portion 20B, and the branch holding portion 20C may also be omitted.

(7) The number of power conductive paths provided in the trunk cable 12 and the number of power conductive paths provided in the branch cable 13 may be one, two, four, or more.

(8) The number of signal conductive paths provided in the trunk cable 12 and the number of signal conductive paths provided in the branch cable 13 may be one, three, or more.

(9) The number of ground conductive paths provided in the trunk cable 12 and the number of ground conductive paths provided in the branch cable 13 may be one, three, or more.

(10) A configuration may also be adopted in which one trunk cable 12 is connected to a plurality of branch cables 13.

LIST OF REFERENCE NUMERALS

10, 80 Branch box
11 Case
12 Trunk cable
13 Branch cable
14 Conductive relay path
15, 81 Cover
18A, 18B Positioning pin
19A, 19B Positioning hole
20A Left holding portion
20B Right holding portion
20C Branch holding portion
26 Fuse
27 Cover shielding member
30 Power trunk conductor
31 Signal trunk conductor
32 Ground trunk conductor
34, 41 Insulating film
36, 43 Insulating layer
39 Ground branch conductor
44 Power trunk opening portion
45 Power trunk land
46 Signal trunk opening portion
48 Signal trunk land
50 Power branch opening portion
51 Power branch land
52 Signal branch opening portion
54 Signal branch land
56 First trunk-side bus bar
57A, 57B, 57C Trunk-side terminal portion
60 First branch-side bus bar
61A, 61B, 61C Branch-side terminal portion
62 Second trunk-side bus bar
63 Second branch-side bus bar
64 Relay bus bar
65 Base shielding member
66 Trunk-side ground terminal portion
70 Branch-side ground terminal portion
71, 110 Insulating plate
82 Trunk operation hole
86 Trunk subcover
88 Branch operation hole
90 Branch subcover
117 Insulating cover
154A, 154B, 155 Embedded portion

What is claimed is:

1. A structure for connecting flexible flat cables, comprising:

a flexible flat trunk cable that includes a signal trunk conductor, a ground trunk conductor, a trunk shield that is electrically connected to the ground trunk conductor and encloses the signal trunk conductor to electromagnetically shield the signal trunk conductor, and an insulating trunk coating for covering the signal trunk conductor, the ground trunk conductor, and the trunk shield;

a flexible flat branch cable that includes a signal branch conductor, a ground branch conductor, a branch shield that is electrically connected to the ground branch conductor and encloses the signal branch conductor to electromagnetically shield the signal branch conductor, and an insulating branch coating for covering the signal branch conductor, the ground branch conductor, and the branch shield;

a relay bus bar that includes a trunk-side terminal portion connected to the signal trunk conductor, and a branch-side terminal portion connected to the signal branch conductor; and a shielding member for enclosing the relay bus bar to electromagnetically shield the relay bus bar; the shielding member includes a trunk-side ground terminal portion connected to the ground trunk conductor, and a branch-side ground terminal portion connected to the ground branch conductor; the shielding member includes a base shielding member that includes the trunk wherein side ground terminal portion and the branch-side ground terminal portion, and a cover shielding member for enclosing the relay bus bar between the base shielding member and the cover shielding member; and wherein an insulating cover made of an insulating synthetic resin is interposed between the relay bus bar and the cover shielding member.

2. The structure for connecting flexible flat cables according to claim 1,
wherein the base shielding member and the cover shielding member are electrically connected to each other.

\* \* \* \* \*